United States Patent
Ishikawa et al.

(10) Patent No.: US 9,818,377 B2
(45) Date of Patent: Nov. 14, 2017

(54) PROJECTION SYSTEM, IMAGE PROCESSING APPARATUS, AND CORRECTION METHOD

(71) Applicants: Masaaki Ishikawa, Kanagawa (JP); Yukinaka Uchiyama, Tokyo (JP)

(72) Inventors: Masaaki Ishikawa, Kanagawa (JP); Yukinaka Uchiyama, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/592,732

(22) Filed: Jan. 8, 2015

(65) Prior Publication Data
US 2015/0213584 A1 Jul. 30, 2015

(30) Foreign Application Priority Data

Jan. 24, 2014 (JP) .................................. 2014-011003
May 1, 2014 (JP) .................................. 2014-094419

(51) Int. Cl.
G09G 5/377 (2006.01)
G06F 3/14 (2006.01)
H04N 9/31 (2006.01)

(52) U.S. Cl.
CPC .......... *G09G 5/377* (2013.01); *G06F 3/1446* (2013.01); *H04N 9/3147* (2013.01);
(Continued)

(58) Field of Classification Search
None
See application file for complete search history.

(56) References Cited

U.S. PATENT DOCUMENTS 7,338,175 B2 * 3/2008 Miyazawa ........... H04N 9/3194
348/E5.144
8,311,366 B2 * 11/2012 Schiewe ............. H04N 9/3194
348/383

(Continued)

FOREIGN PATENT DOCUMENTS

JP          3908255         4/2007
JP       2011-182079       9/2011
(Continued)

OTHER PUBLICATIONS

U.S. Appl. No. 14/485,029, filed Sep. 12, 2014.
U.S. Appl. No. 14/341,094, filed Jul. 25, 2014.

*Primary Examiner* — Hilina K Demeter
(74) *Attorney, Agent, or Firm* — Harness, Dickey & Pierce, P.L.C.

(57) ABSTRACT

A projection system includes projection units collectively projecting an image as a whole on a projection area; a generation unit generating correction images including correction points which are used for detecting distortions of projection images based on designated relationships; and a compensation coefficient calculation unit calculating compensation coefficients, based on correction captured images acquired from the correction images on the projection area. Further, margin parts are generated in the correction images in a manner so that parts defining the correction points in the correction images are projected within the projection area while the parts defining correction points in the correction images corresponding to the projection units that are next to each other are overlapped.

18 Claims, 27 Drawing Sheets

(52) U.S. Cl.
CPC ......... *H04N 9/3185* (2013.01); *H04N 9/3194* (2013.01); *G09G 2320/0285* (2013.01); *G09G 2320/08* (2013.01); *G09G 2340/12* (2013.01)

(56) References Cited

U.S. PATENT DOCUMENTS

| | | | | |
|---|---|---|---|---|
| 8,328,365 | B2* | 12/2012 | Sun | H04N 9/12 |
| | | | | 353/69 |
| 8,451,381 | B2* | 5/2013 | Kaise | H04N 5/44513 |
| | | | | 348/580 |
| 8,586,904 | B2 | 11/2013 | Furui | |
| 2002/0024640 | A1* | 2/2002 | Ioka | G03B 21/13 |
| | | | | 353/94 |
| 2002/0180727 | A1* | 12/2002 | Guckenberger | G06T 11/60 |
| | | | | 345/418 |
| 2003/0052837 | A1* | 3/2003 | Raskar | H04N 9/12 |
| | | | | 345/32 |
| 2004/0169827 | A1* | 9/2004 | Kubo | G03B 21/005 |
| | | | | 353/94 |
| 2005/0206857 | A1* | 9/2005 | Yamada | G03B 21/56 |
| | | | | 353/94 |
| 2006/0181685 | A1* | 8/2006 | Hasegawa | G03B 37/04 |
| | | | | 353/69 |
| 2008/0136976 | A1 | 6/2008 | Ajito et al. | |
| 2008/0266321 | A1* | 10/2008 | Aufranc | G03B 21/26 |
| | | | | 345/626 |
| 2011/0210979 | A1* | 9/2011 | Furui | H04N 9/3147 |
| | | | | 345/619 |
| 2011/0210987 | A1* | 9/2011 | Furui | H04N 9/31 |
| | | | | 345/682 |
| 2013/0222386 | A1* | 8/2013 | Tannhauser | G06T 3/4038 |
| | | | | 345/428 |
| 2014/0111536 | A1* | 4/2014 | Shinozaki | G09G 5/37 |
| | | | | 345/589 |
| 2014/0146080 | A1* | 5/2014 | Ivashin | G09G 5/12 |
| | | | | 345/629 |
| 2014/0153090 | A1* | 6/2014 | Takenouchi | G03B 21/602 |
| | | | | 359/453 |

FOREIGN PATENT DOCUMENTS

| | | |
|---|---|---|
| JP | 2013-074475 | 4/2013 |
| WO | 2006/025191 A1 | 3/2006 |

* cited by examiner

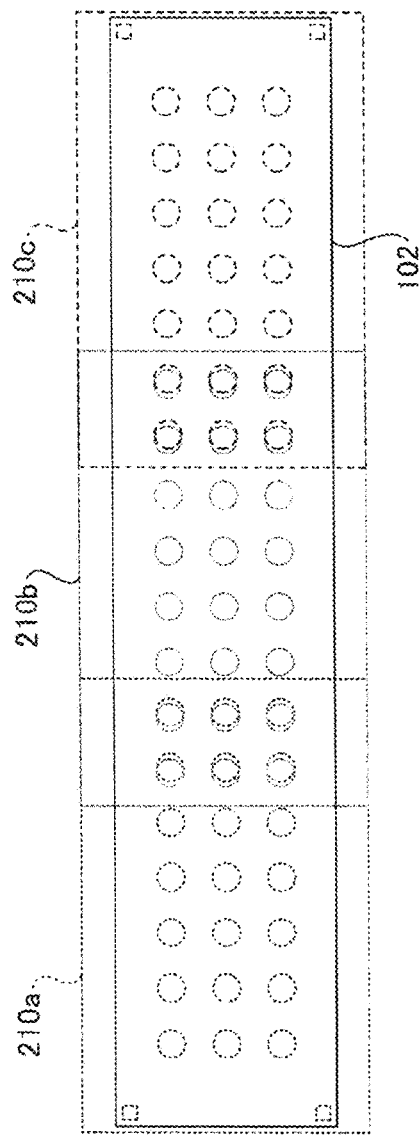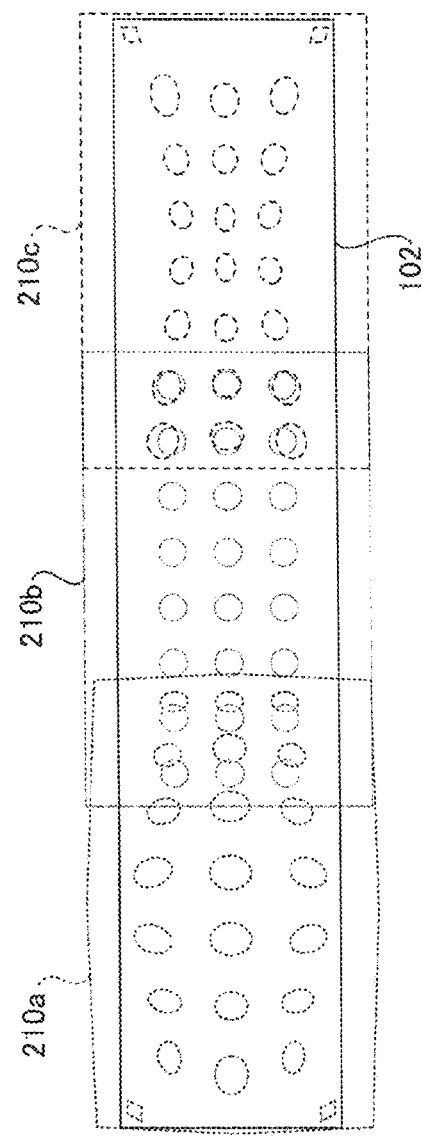

FIG.14A

| PROJECTOR COORDINATES (INTEGER) | | CONTENT COORDINATES (DECIMAL POINT) | |
|---|---|---|---|
| X | Y | X | Y |
| 0 | 0 | ... | ... |
| 1 | 0 | ... | ... |
| 2 | 0 | ... | ... |
| ... | ... | ... | ... |
| 1279 | 0 | ... | ... |
| 0 | 1 | ... | ... |
| 1 | 1 | ... | ... |
| 2 | 1 | ... | ... |
| ... | ... | ... | ... |
| 1277 | 799 | ... | ... |
| 1278 | 799 | ... | ... |
| 1279 | 799 | ... | ... |

FIG.14B

| PROJECTOR COORDINATES (INTEGER) | | BLENDING COEFFICIENT |
|---|---|---|
| X | Y | |
| 0 | 0 | ... |
| 1 | 0 | ... |
| 2 | 0 | ... |
| ... | ... | ... |
| 1279 | 0 | ... |
| 0 | 1 | ... |
| 1 | 1 | ... |
| 2 | 1 | ... |
| ... | ... | ... |
| 1277 | 799 | ... |
| 1278 | 799 | ... |
| 1279 | 799 | ... |

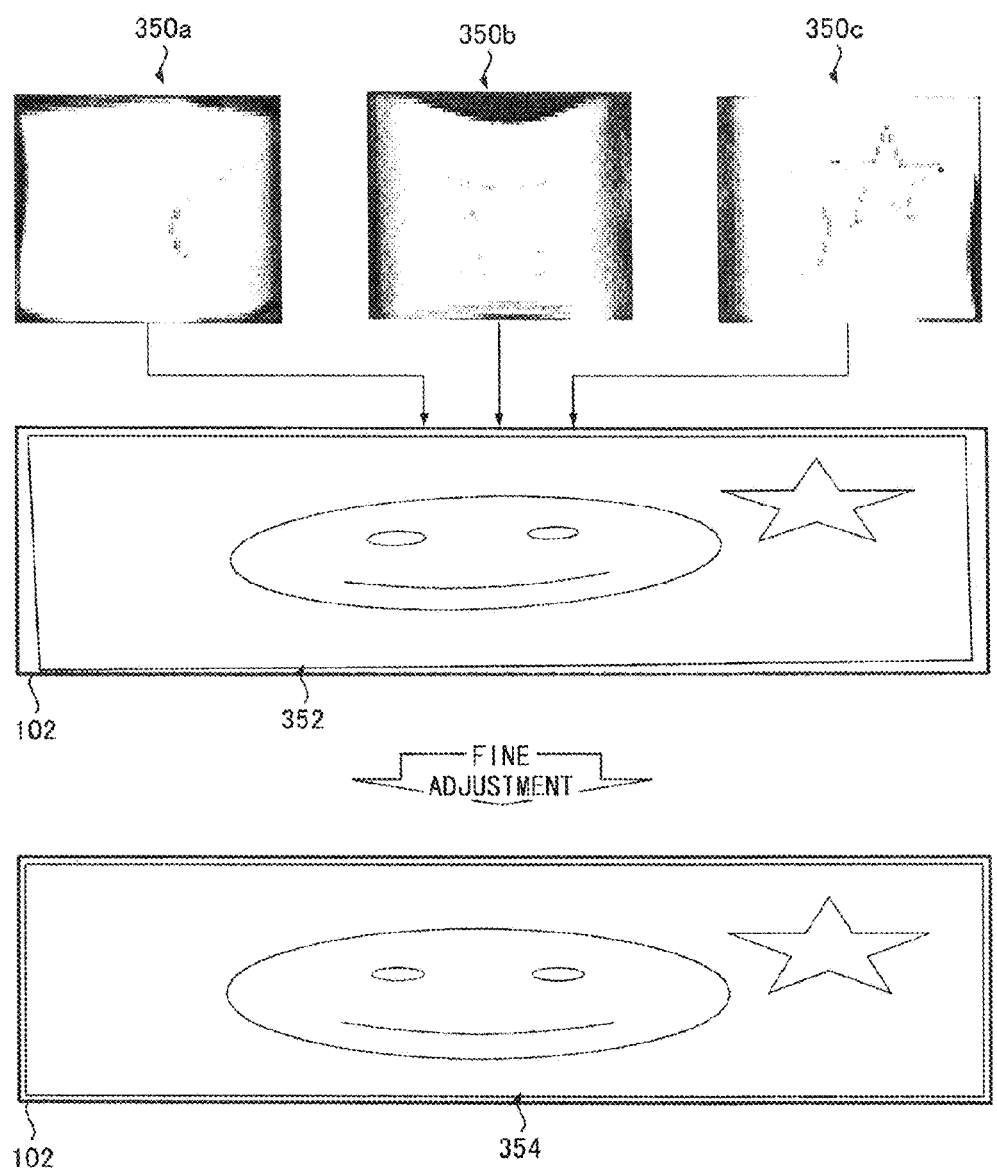

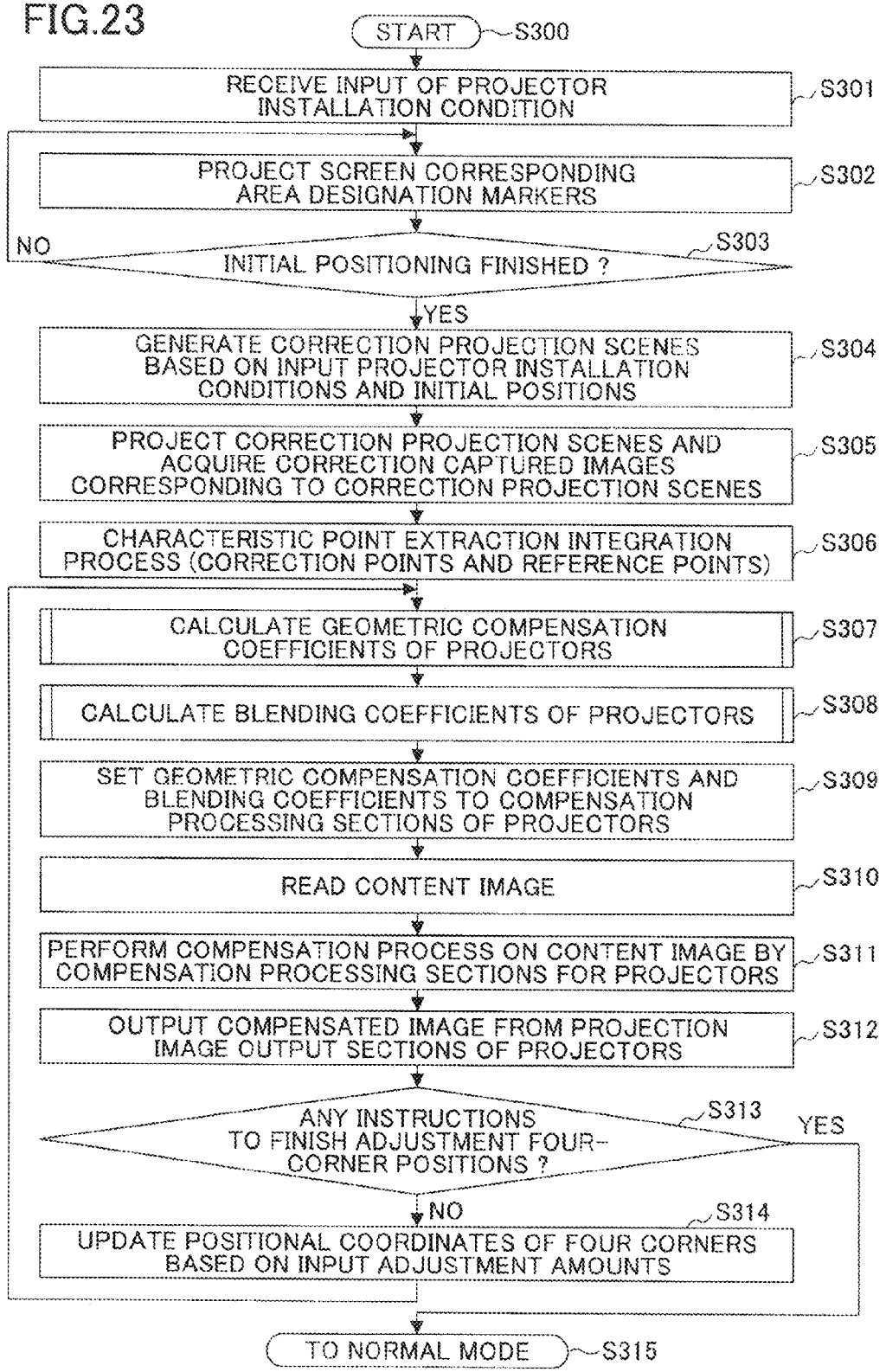

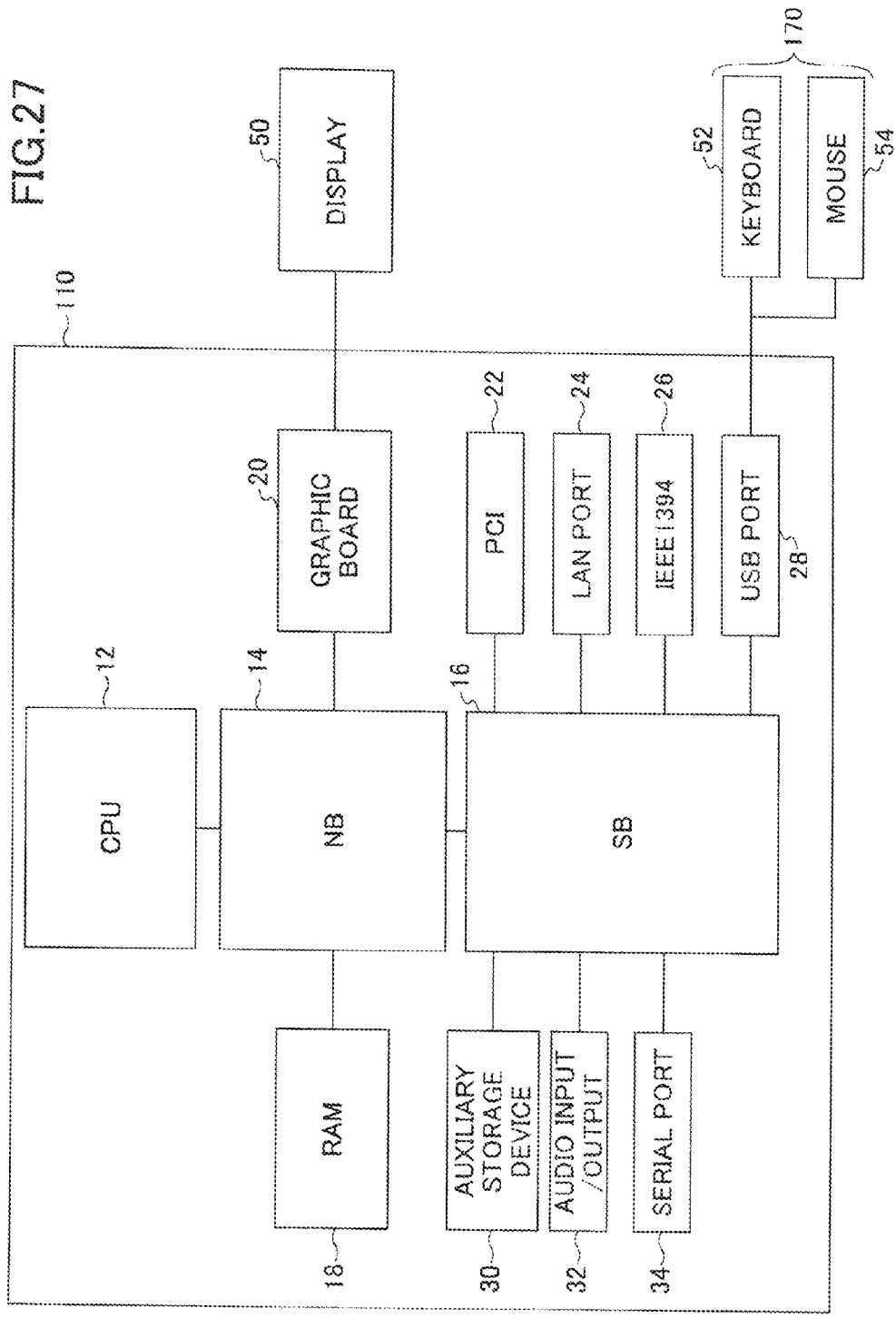

PROJECTION SYSTEM, IMAGE PROCESSING APPARATUS, AND CORRECTION METHOD

CROSS-REFERENCE TO RELATED APPLICATIONS

The present application is based on and claims the benefit of priority under 35 U.S.C §119 of Japanese Patent Application Nos. 2014-011003 filed Jan. 24, 2014 and 2014-094419 filed May 1, 2014, the entire contents of which are hereby incorporated herein by reference.

BACKGROUND OF THE INVENTION

1. Field of the Invention

The present invention generally relates to a projection system, an image forming apparatus, and a correction method, a system, and a recording medium (program). More specifically, the present invention relates to a projection system for projecting an image on a projection body by a plurality of projectors, an image processing apparatus included in the projection system, a correction method performed by a computer, a system including a program for realizing the image processing apparatus and a projection apparatus, and a recording medium storing a program for realizing the image processing apparatus.

2. Description of the Related Art

Recently, more and more attention has been paid to a multiple projection technique in which a plurality of projectors are arranged in a manner so that the projection images from the projectors are overlapped with each other in overlapped areas, so that a single and high-resolution image can be projected on a screen.

It is known that such a multiple projection technique is disclosed in Japanese Patent No. 3908255 ("Patent Document 1"). In the image projection system in Patent Document 1, in the correction, a reference image having four or more characteristic points whose coordinate positions are already known is projected on a screen from each of projectors. Here, the reference image refers to a known image in which, for example, bright spots or crosses are arranged at a constant interval.

Then, the positions of the characteristic points on the reference image captured (imaged) by a digital camera are detected. Further, based on the detected positions of the four or more characteristic points of the projectors, the projection images of the projectors are transformed and the overlapped area is detected and a blending process is performed. By projecting the transformed and the blending-processed images on the screen by the projectors in a manner such that the images are arranged so as to have the overlapped area with each other, a single and high-resolution image can be projected.

In addition, there is a known technique about a correction method in the multiple projection or a stack production (see, for example, Japanese Patent Laid-open Publication No. 2013-074475 ("Patent Document 2")).

In the related art projection system described above, a status is assumed in which a projection can be made without especially taking care of a position of a projection image in a wide screen like a wall. However, there may be a case in which a projection image is desired to be imaged to fit within a plane screen which is separated from a wall like a white board with legs for an exhibition event, advertisement, etc., or a projection image is desired to be imaged to fit within a projection area of a dedicated screen which is attached to a wall (without being separated from the wall) having patterns such as marble stone.

SUMMARY OF THE INVENTION

According to an aspect of the present invention, a projection system include a plurality of projection units collectively projecting an image as a whole on a projection area; a generation unit generating correction images including respective correction points which are used for detecting distortions of projection images, which are projected by the respective projection units, based on designated relationships between the projection images of the projection units and the projection area; and a compensation coefficient calculation unit calculating compensation coefficients, which correspond to the projection units, based on one or more correction captured images that are acquired by capturing the correction images projected on the projection area. Further, the generation unit further generates margin parts in the corrected images, which correspond to the projection units that project the projection images in charge of outer areas of the projection area, in a manner so that parts defining the correction points in the correction images are projected within the projection area while the parts defining correction points in the correction images correspond to the projection units that are next to each other are overlapped.

BRIEF DESCRIPTION OF THE DRAWINGS

Other objects, features, and advantages of the present invention will become more apparent from the following description when read in conjunction with the accompanying drawings, in which:

FIGS. 6A and 6B illustrate example projection states when the correction images of FIGS. 5A through 5C are used;

FIG. 14A illustrates an example data structure of the geometric compensation coefficient;

FIG. 14B illustrates an example data structure of the blending coefficient;

FIG. 15 is a drawing illustrating an example compensation process based on the compensation coefficient performed by a compensation processing part according to an embodiment;

FIG. 23 is a flowchart of an overall process of a correction process according to a second embodiment;

FIG. 27 is a drawing illustrating an example hardware configuration of a general-purpose computer apparatus according to an embodiment.

DETAILED DESCRIPTION OF THE PREFERRED EMBODIMENTS

In the related art technology of a multiple projection technique, an image for correction is basically used, in which the characteristic points are arranged in a lattice manner in every part of the whole projectable image. In this case, it is desired to adjust the position of the projection image, the zoom and the projection angles of the projectors so as to project images within the respective projection areas to be projected on where the patterns of the characteristic points are projected so as to project the images without forming a gap therebetween.

However, depending on the condition, it is difficult to perform the adjustments. This is because the adjustable range is limited due to relationships between shape characteristics such as an aspect ratio of the projection area to be projected on and installation conditions such as an aspect ratio of a projectable area of the projectors and the number of the connections (projectors).

The present invention is made in light of the problem, and may provide a projection system, an image processing apparatus, a correction method, a system, and a program which are capable of easily performing a correcting operation of a plurality of projection means (projectors) based on relationships between the projection images of the projectors and a projection target area where a whole image is projected by the projectors.

In the following, embodiments of the present invention are described. However, it should be noted that the present invention is not limited to the embodiments. In the following embodiments, as an example of a projection system, a projection system 100 is described which includes a plurality of projectors, which are projection means, a camera, which is an imaging means, and an image processing apparatus which performs overall control.

Whole Configuration

Figure 1:
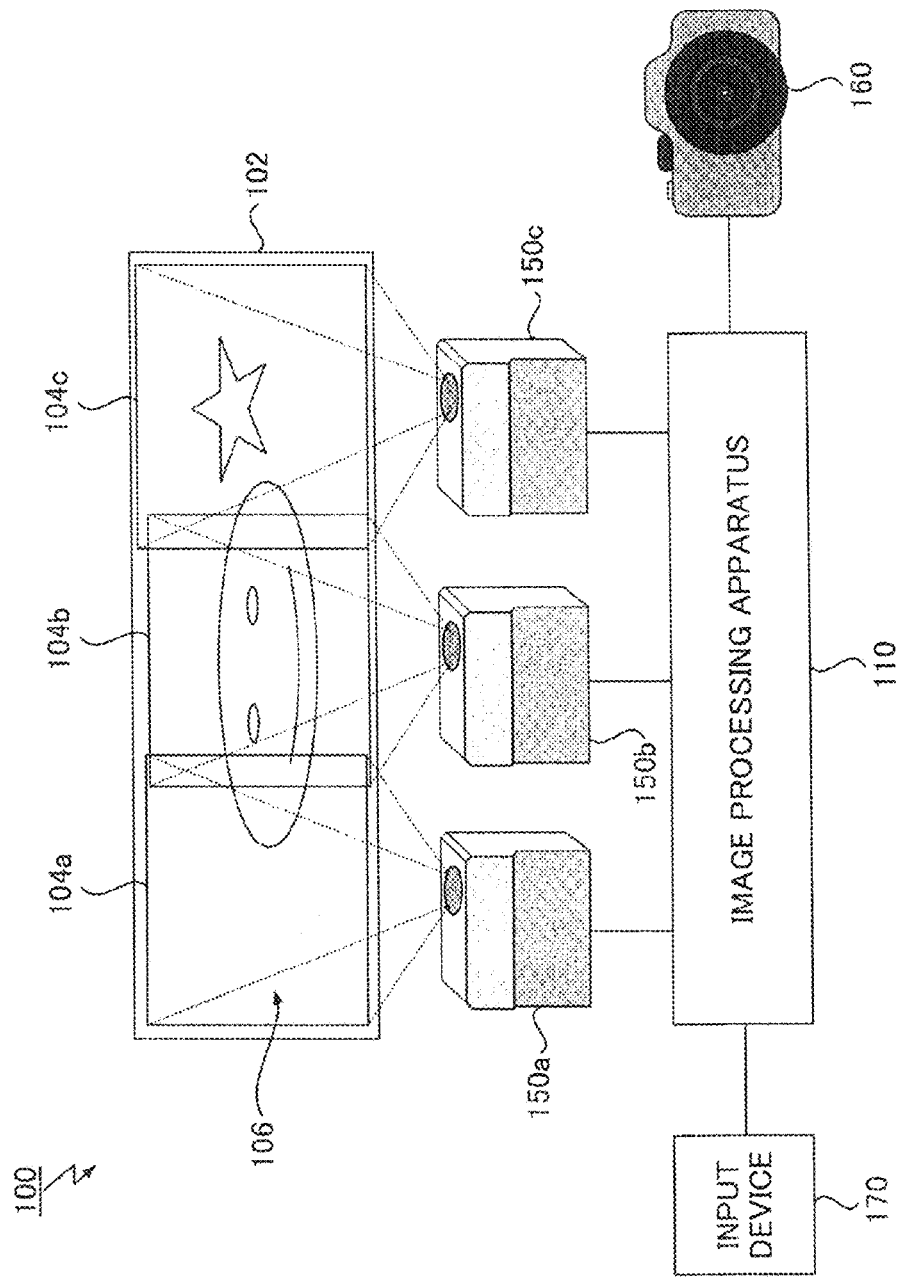
FIG. 1 is a drawing schematically illustrating an example overall configuration of a projection system according to an embodiment.

FIG. 1 schematically illustrates an example overall configuration of the projection system 100 according to an embodiment. The projection system 100 of FIG. 1 includes an image processing apparatus 110, which performs overall control of the system, a plurality of projectors 150, a camera 160, and an input device 170. The configuration of the projection system 100 is not limited to a specific configuration.

However, in the following description, a case is described where the projection images of three projectors 150a, 150b, and 150c are combined on the projection surface (i.e., a configuration corresponding to a so-called "multiple projection"), so that an image based on the combined images is projected in an area which is greater than a projection area of a single projector.

As the image processing apparatus 110, a general-purpose computer such as a personal computer, a workstation, etc., can be typically used. Note that the image processing apparatus 110 is not limited to such a general-purpose computer. For example, the image processing apparatus 110 may be implemented as a dedicated computer. Otherwise, the image processing apparatus 110 may be implemented in any of the projectors 150 or in a device such as a tablet computer.

The projectors 150 are projection devices which employ a liquid crystal method, a Digital Light Processing (DLP) method, a Liquid Crystal On Silicon (LCOS) method or the like. The camera 160 is an imaging device which includes an image sensor, such as a Complementary Metal Oxide Semiconductor (CMOS), a Charge Coupled Device (CCD) or the like, and an imaging forming optical system such as a lens for forming an image on a light receiving area of the image sensor. The camera 160 may be provided as a dedicated device such as a World Wide Web (WEB) camera, a digital still camera, a digital video camera, etc., or may be integrated into a device such as a smartphone terminal, a tablet terminal, etc.

The input device 170 refers to an input device such as a mouse, a keyboard, a touch panel, an operation panel, etc., to receive instructions from a user. The input device 170 is used when an image is generated for correction and when a correction result is finely adjusted. Here, the input device 170 may be connected to the image processing apparatus 110, the projectors 150, or the camera 160, or may be a device integrated therein.

In the projection system 100, there is installed a screen 102 which is a projection body that provides a projected area. The projectors 150 are installed in a manner so that projection centers of the respective images projected by the projectors 150 are separated from each other on the screen 102. The image processing apparatus 110 generates data for plural projection images to be projected by the projectors 150a, 150b, and 150c, and outputs data for the plural projection images to the respective projectors 150.

The projectors 150 project the respective projection images, for which data are input from the image processing apparatus 110, on the screen 102. On the screen 102, as illustrated in FIG. 1, a plurality of projection images 104a, 104b, and 104c are projected by the respective projectors 150a, 150b, and 150c. The projection images 104a, 104b, and 104c are combined on the projection surface to form a single projection image 106.

In the projection system 100, a correction process is usually performed before projection (a projection mode). The camera 160 of FIG. 1 is used in the correction process (correction mode). In the correction mode, the projectors 150 output respective images to be used for correction ("corrected images") and project the corresponding projection images on the screen 102. Here, a view point and a view field of the camera 160 are set in a manner so that the projection image is projected within an angle of view. To that end, typically, image forming for the correction is performed several times.

The captured image captured by the camera 160 (hereinafter, a captured image in which the corrected image is captured is referred to as a "correction captured image") is transmitted to the image processing apparatus 110 via a wireless connection, such as a wireless Local Area Network (LAN), Bluetooth (registered trademark), a Wireless Universal Serial Bus (USB), etc., or a wired connection such as a wired USB, a wired LAN, etc. Otherwise, a captured image may be read by the image processing apparatus 110 via a removable medium such as an SD card (registered trademark), a Compact Flash (registered trademark), etc.

The image processing apparatus 110 performs the correction process by using one or more correction captured images which are input to the image processing apparatus 110. After completing the correction, the image processing apparatus 110 performs projection of a content image while compensating the content image based on the correction result. In the following, with reference to FIG. 2, an example functional configuration is described related to the correction process and the projection process after the correction.

Functional Configuration

Figure 2:
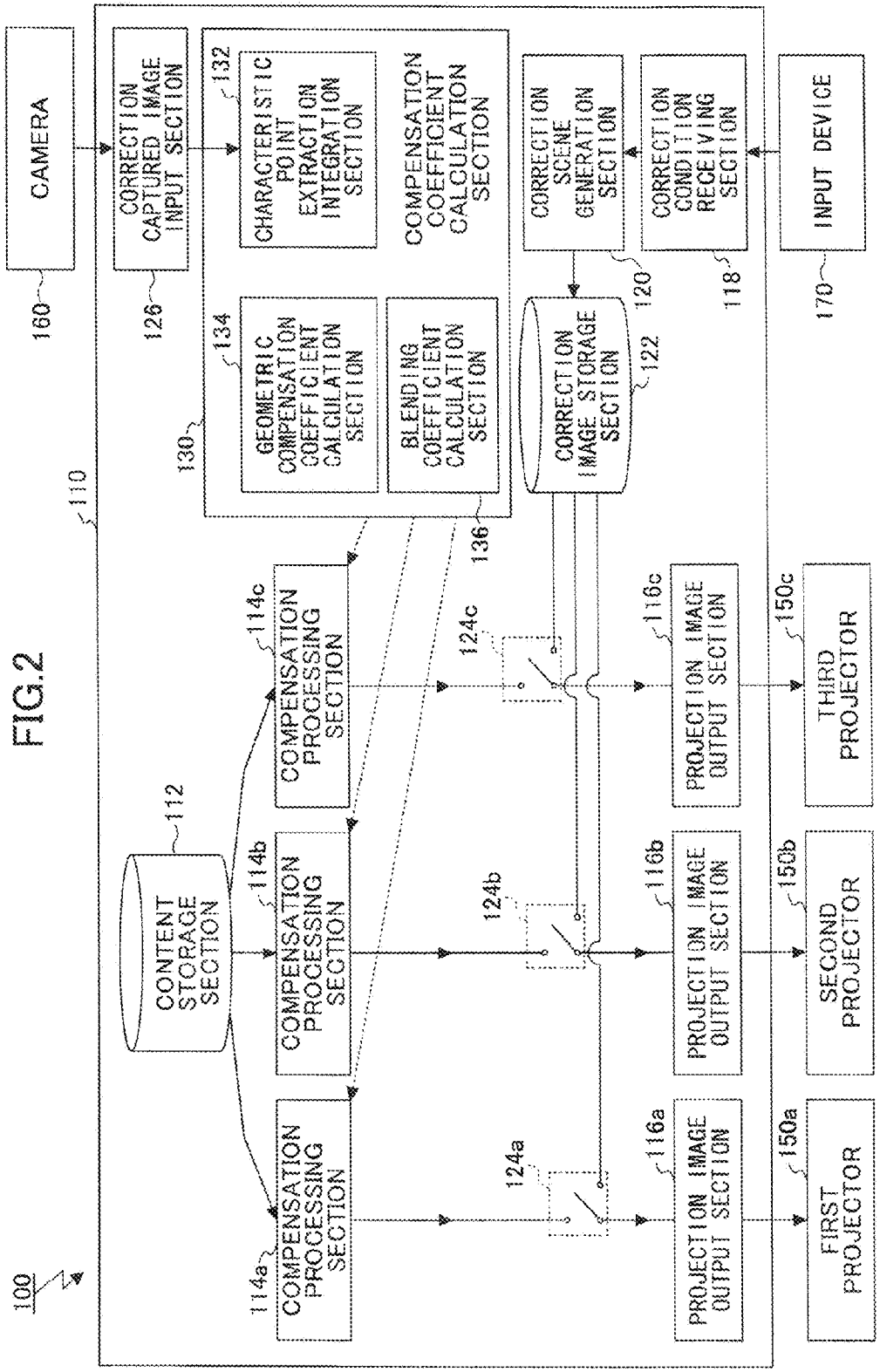
FIG. 2 is an example functional block diagram of the projection system according to an embodiment.

FIG. 2 is a functional block diagram of the projection system 100 according to an embodiment. The projection system 100 includes a content storage section 112. The projection system 100 further includes compensation processing sections 114a, 114b, and 114c, projection image output sections 116a, 116b, and 116c, and switching sections 124a, 124b, and 124c corresponding to the projectors 150a, 150b, and 150c. The projection system 100 further includes a correction condition receiving section 118, a correction scene generation section 120, a corrected image storage section 122, a correction captured image input section 126, and a compensation coefficient calculation section 130.

The content storage section 112 stores a content image which is a signal source to be projected as a single projection image 106. As the content storage section 112, a Random Access Memory (RAM), a Hard Disk Drive (HDD), a Solid State Drive (SSD), a detachable removable medium or the like having a memory area may be used.

Here, the content image to be projected may be given as a display screen which is displayed when a file is executed in an application such as presentation, or may be given as a still image file or as a frame at an arbitrary timing in a moving image file. Otherwise, the content image may be given as an image generated by the execution of an Operating System or as an video image which is input externally. In the following, for explanatory purposes, a case is described as an example where a still image is given as the content image.

The compensation processing sections 114a, 114b, and 114c are provided so as to correspond to the projectors 150a, 150b, and 150c included in the projection system 100. The compensation processing sections 114a, 114b, and 114c read the content image from the content storage section 112, and perform the compensation process on the content image to generate the respective projection images for the projectors 150a, 150b, and 150c.

The projection image output sections 116a, 116b, and 116c are provided so as to correspond to the projectors 150a, 150b, and 150c included in the projection system 100. The projection image output sections 116a, 116b, and 116c include respective display output interfaces corrected to the projectors 150a, 150b, and 150c, so as to output the input images which are selected by the switching sections 124a, 124b, and 124c.

The switching sections 124a, 124b, and 124c switch flows of image signals based on an operation mode of the projection system 100. In the projection mode where the content image is projected, the switching sections 124a, 124b, and 124c select the respective outputs from the compensation processing sections 114a, 114b, and 114c to be input into the switching sections 124a, 124b, and 124c.

On the other hand, in the correction mode, the switching sections 124a, 124b, and 124c select the respective outputs from the corrected image storage section 122 to be input into the switching sections 124a, 124b, and 124c. Accordingly, the projection image output sections 116a, 116b, and 116c output the respective correction images.

The correction image storage section 122 stores correction images which are to be projected from the projectors 150a, 150b, and 150c in the correction mode. As the correction image storage section 122, the RAM, the HDD, the SSD, the detachable removable medium or the like having a memory area may be used. The correction images are typically generated as still images by the correction scene generation section 120 based on various conditions received by the correction condition receiving section 118. Details of the process of generating the correction images are described below.

In the correction process according to an embodiment, an image for the correction is captured several times. The image processing apparatus 110 reads the correction images from the correction image storage section 122, and causes the projectors 150a, 150b, and 150c to output the respective correction images in a timely manner. In this case, the image processing apparatus 110 knows the positional relationships of the projection images of the projectors 150a, 150b, and 150c.

Further, the image processing apparatus 110 selects the correction images in accordance with the steps of the correction process and cause the projectors 150a, 150b, and 150c to project the selected correction images so as to acquire the correction results of all the projectors 150a, 150b, and 150c necessarily and sufficiently as a whole. Hereinafter, scenes which are formed by projecting images by the projectors 150a, 150b, and 150c in steps of the correction process is referred to as "correction projection scenes".

A user uses the camera 160 to capture an image for the correction projection scenes in a manner so that the projected correction image is within an angle of view of the camera 160. The correction captured image input section 126 receives an input of the captured images from the camera 160 via a wireless connection, a wired connection, or a removable medium, so as to acquire plural correction captured images.

The compensation coefficient calculation section 130 calculates compensation coefficients corresponding to the projectors 150a, 150b, and 150c based on one or more correction captured images in which the respective projected correction images are captured. More specifically, the compensation coefficient calculation section 130 includes a characteristic point extraction integration section 132, a geometric compensation coefficient calculation section 134, and a blending coefficient calculation section 136.

The characteristic point extraction integration section 132 extracts characteristic points from each of the one or more correction captured images which are acquired by the correction captured image input section 126 in response to the one or more correction projection scenes described above.

Here, it is assumed that the correction captured images and the correction projection scenes are associated with each other and input into the correction captured image input section 126. In the described embodiment, the correction image includes an arrangement of a correction pattern to be used for detecting a distortion of the projection image of the projector that projects the correction image. The characteristic point extraction integration section 132 extracts a group of correction points that are defined by the correction pattern. The characteristic points extracted from the correction captured images are extracted as the coordinate positions on the coordinate system of the extracted original image, and are integrated into a single coordinate system.

The geometric compensation coefficient calculation section 134 calculates geometric compensation coefficients based on the group of the correction points for the projectors 150a, 150b, and 150c, and sets the geometric compensation coefficients to be used in the compensation processing sections 114a, 114b, and 114c. The geometric compensation coefficients are compensation coefficients in which geometric compensation factors such as position alignment, scale alignment, distortion compensation, etc., are included (considered), so as to provide projection images projected from the projectors 150a, 150b, and 150c.

The blending coefficient calculation section 136 calculates compensation coefficients of blending of the projection images and sets the compensation coefficients to be used in the compensation processing sections 114a, 114b, and 114c. The blending coefficients are compensation coefficients that are used for adjusting colors and brightness when images are superimposed in an overlapped area.

More specifically, the blending coefficient calculation section 136 detects overlapped areas where the image of a target projector and each of the images of other projectors adjacent to the target projector are overlapped, and calculates the blending coefficients based on the detection results of the overlapped areas. By using the blending coefficients for the projectors 150a, 150b, and 150c, it becomes possible to smoothly combine the images in the overlapped areas between the projection images of the projectors adjacent to each other.

The compensation processing sections 114a, 114b, and 114c generate the projection images to be output from the projectors 150a, 150b, and 150c based on the content image to be projected as a whole by using the various compensation coefficients that are calculated by the geometric compensation coefficient calculation section 134 and the blending coefficient calculation section 136. More specifically, intermediate images for the projectors 150a, 150b, and 150c are generated based on the image as a whole by using the calculated geometric compensation coefficients.

Further, based on the intermediate images, the corresponding final projection images are generated by using the calculated blending coefficients. In the projection mode where the content image is projected, the switching sections 124a, 124b, and 124c are switched to select to input the respective outputs from the compensation processing sections 114a, 114b, and 114c. Accordingly, the projection image output sections 116a, 116b, and 116c output the respective projection images which are given as the processing results of the compensation processing sections 114a, 114b, and 114c.

Further, in the embodiment illustrated in FIG. 2, a case is described where the elements (function sections) 112 through 136 are implemented in a single image processing apparatus 110. However, the projection system 100 of the present invention is not limited to the system illustrated in FIG. 2. For example, in another embodiment, in order to reduce the workload focused on the image processing apparatus as increase of the number of projectors, the functions of the compensation processing sections may be implemented in the respective projectors.

In still another embodiment, the elements (function sections) 112 through 136 are distributedly implemented into two or more image processing apparatuses 110. Otherwise, all the elements (function sections) 112 through 136 are implemented in any of the projectors. Otherwise, there may be provided a single apparatus that includes the functions of the image processing apparatuses 110 and the a plurality of the projectors. In still another embodiment, the functions of the compensation coefficient calculation section 130 may be provided by a server via a network.

Generation Process of the Correction Image According to the First Embodiment

In the following, the generation process of generating the correction images in the first embodiment is described in more detail with reference to the FIGS. 3A through 6B. As described above, in the projection system 100, for each of the correction projection scenes, the projectors 150a, 150b, and 150c project the respective correction images, and the projected projection images are captured by the camera 160 in a manner so that the projected projection images can be captured within the angle of view of the camera 160.

Figure 3A:
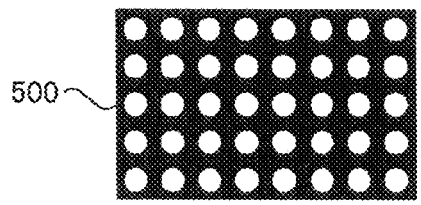
FIGS. 3A through 3D are drawings illustrating a problem in a correction process.
Figure 3B:
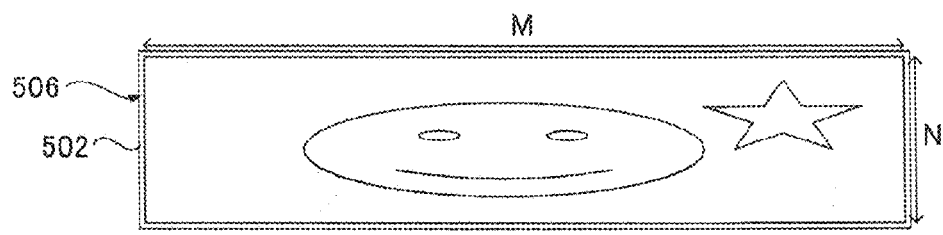

In typical related-art correction, a correction image 500 as illustrated in FIG. 3A is widely (fixedly) used in which correction patterns (in the example of FIG. 3, circular patterns) defining the correction points in a whole projectable image area are arranged in a lattice manner in every part of the area. Due to this feature, when the positions and the sizes of the projection images are attempted to be adjusted by changing the zoom, projection angles, etc., in a manner so that the correction patterns do not protrude outside the screen display range and no gaps are generated, there may be a case where it is not possible to adjust depending on conditions. This is because, the adjustable range may be limited depending on the relationships between the shape characteristics such as an aspect ratio of the screen to be projected on and the installation conditions such as the aspect ratio of the projectable areas of the projectors and the number of the connected projectors, etc.

Here, a case is described where a projection image 506 is acquired in which a content image having an aspect ratio of M:N just fits a screen 502 having an aspect ratio of M:N. Further, in this case, it is assumed that the aspect ratio of the screen 502 and the content image is 48:10 in a horizontally-long (landscape) shape and three projectors having an aspect ratio of 16:10 and resolution of 1280 by 800 arranged in one line in the horizontal direction are used.

Figure 3C:
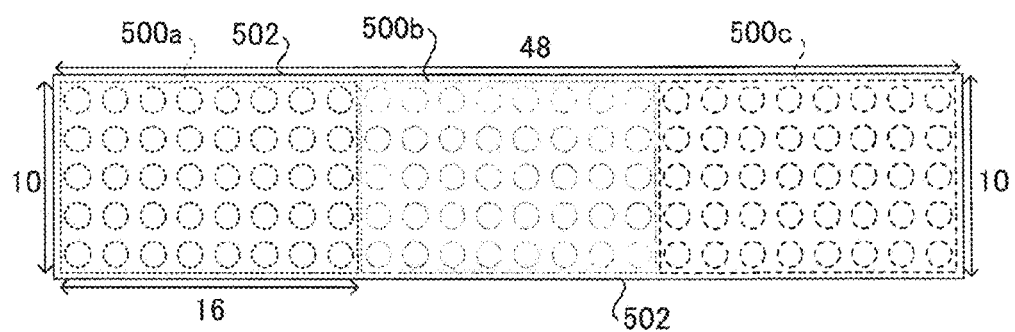
Figure 3D:
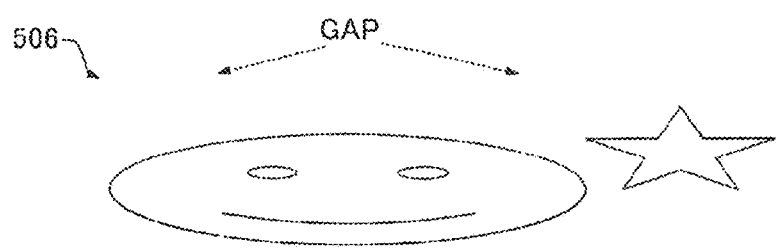

In order to project the correction pattern in a manner so that the projected correction pattern does not protrude outside the screen 502, as illustrated in FIG. 3C, it is necessary for the correction images 500a, 500b, and 500c to be projected without forming any overlapped areas at all. When no overlapped areas are formed, it becomes difficult to appropriately connect the projection images because gaps as illustrated in FIG. 3D may be generated due to distortions of the projection images in actual use.

Figure 4A:
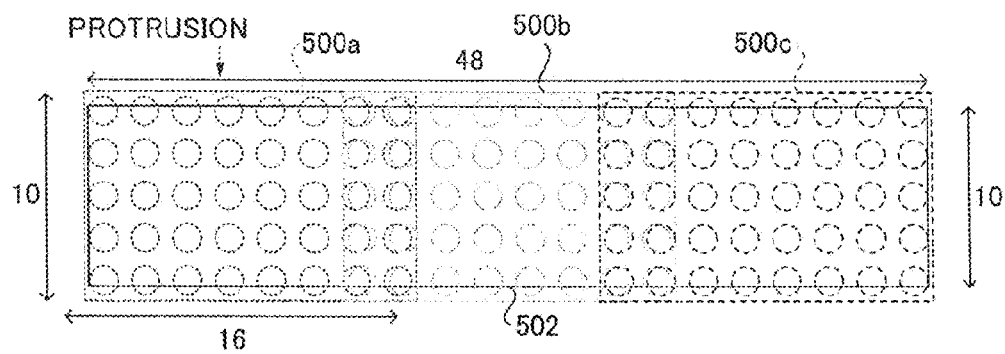
FIGS. 4A through 4E are drawings illustrating another problem in the correction process.

On the other hand, when an appropriate amount of the overlapped areas are to be secured, as illustrated in FIG. 4A, at least a part of the correction patterns in the correction images 500a, 500b, and 500c may protrude outside the screen 502. Such protrusion may not cause a problem when there is no step between the inside and the outside of the screen 502. However, when, for example, a whiteboard with legs separated from a wall as a plane screen is used, the protruded correction patterns are projected on the site which is separated from the whiteboard with legs.

Figure 4B:
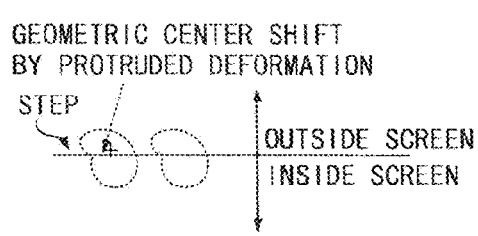

Further, then there is the correction pattern near the boundary of the screen 502, a part of the correction pattern may be dropped out (lacking), or may be deformed as illustrated in FIG. 4B, so that the positional information of the geometric center of the correction pattern may not be correctly extracted and accordingly a distortion may be generated in the correction result.

Figure 4C:
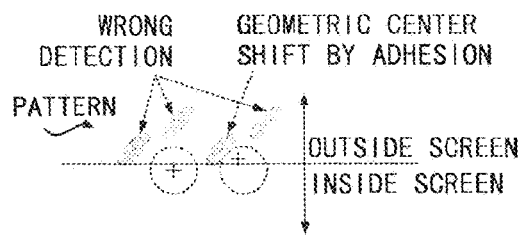

Further, as illustrated in FIG. 4C, the screen 502 is attached to a wall made of a marble stone, and the correction pattern may be projected on an area outside the screen 502 where there is a pattern. In this case, the pattern may become noise and may be adhered to a pattern near a boundary of the screen. Further, such noise may be wrongly detected as the pattern. When the correction pattern is adhered to the pattern, the geometric center of the pattern may be shifted, so that it becomes difficult to accurately detect the positional information of the pattern and accordingly distortion may be generated in the correction result. Further, if a pattern that should not be detected is wrongly detected, it may become difficult to cause the lattice pattern to correspond to the coordinates on the projector memory, which may cause an extraction error.

Figure 4D:
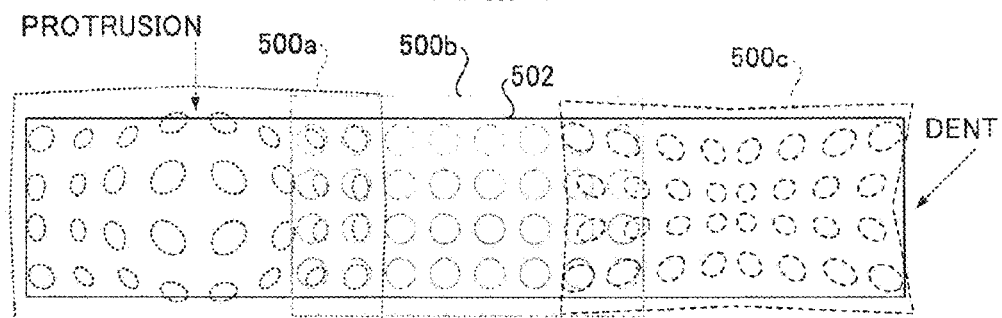
Figure 4E:
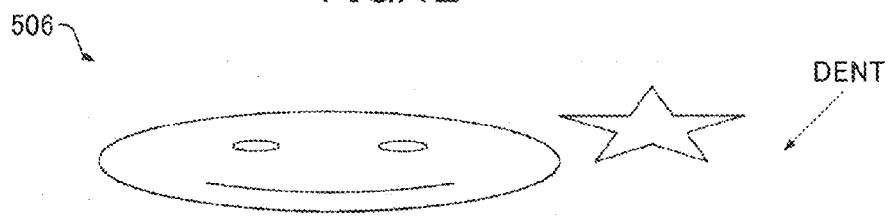

Further, in a case of an ultra-short focus projector that projects an image on the screen at an extremely close distance from the projector, even when there are slight convex and concave curves in the screen, a non-liner distortion may be generated in the projection image. Due to this, it is more likely to occur than usual that the correction pattern protrudes outside the screen as illustrated in FIG. 4D and there is formed an area where images cannot be projected so that a part of the content image to be projected is lacking in the projection image as illustrated in FIGS. 4D and 4E.

To overcome the problems, in the projection system 100 according to the first embodiment, the correction condition receiving section 118 receives the input of the installation conditions of the projectors 150a, 150b, and 150c and the shape characteristics of the screen 102 from a user. Further, the correction scene generation section 120 generates the correction images that are optimized for the projectors 150a, 150b, and 150c based on the relationships between the installation conditions and the shape characteristics. Further, in a preferred embodiment, four-corner markers area to be used as the marks for position alignment are included in the correction images so that the four corners of the correction image are positions at the four corners of the screen 102.

By having the four-corner markers, it becomes to provide a user interface that can make it easier for a user to perform an adjustment operation to fit the projection area of the content image to the screen 102. In the first embodiment, the installation conditions of the projectors 150a, 150b, and 150c and the shape characteristics of the screen 102 define the relationships between the projection images of the projectors 150a, 150b, and 150c and the screen 102, and more specifically, the geometric relationships therebetween.

Figure 5A:
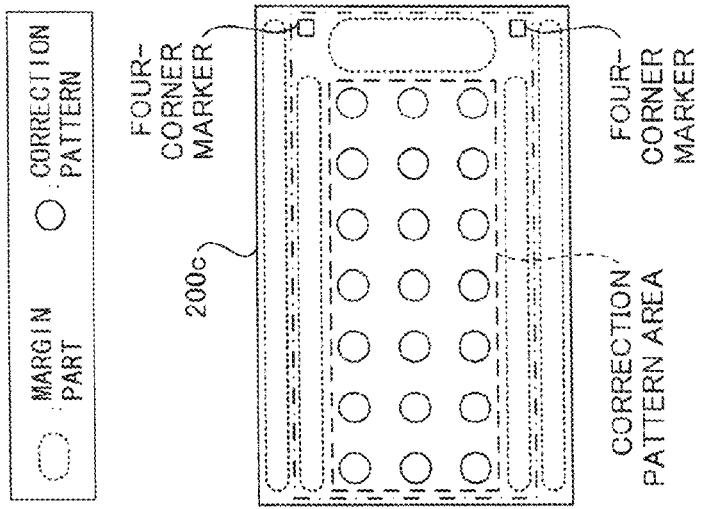
FIGS. 5A through 5C are drawings exemplarily illustrating respective correction images horizontally arranged in a line, the correction images being generated for three projectors according to a first embodiment.
Figure 5B:
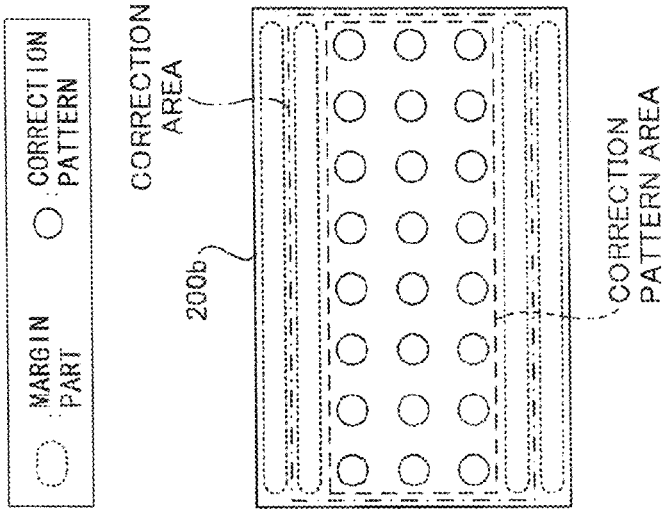
Figure 5C:
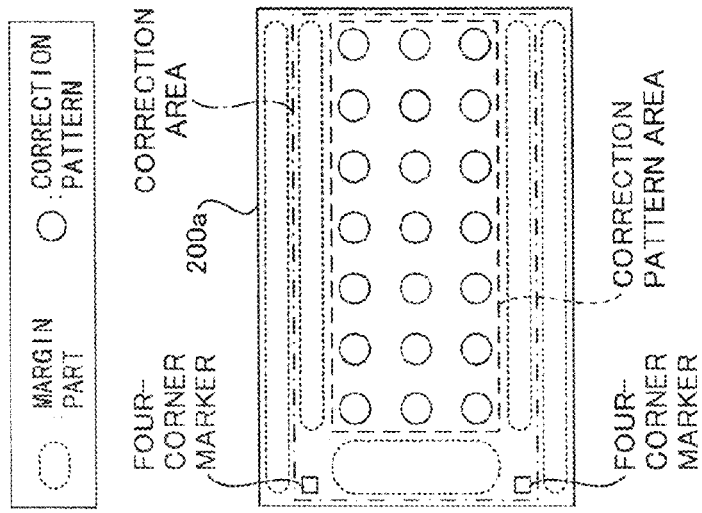

FIGS. 5A, 5B, and 5C illustrate the three correction images that are generated relative to the projectors 150a, 150b, and 150c so that the projection images are arranged in one line in the horizontal direction. The correction images in FIGS. 5A through 5C are formed under the conditions that the aspect ratio of the screen is 48:10, the aspect ratio of the projectors 150a, 150b, and 150c is 16:10, and the width of the overlapped areas between the projection images of the projectors adjacent to each other in the horizontal direction correspond to at least $4/16$ of the width of the projection images in the horizontal direction.

As illustrated in FIGS. 5A through 5C, the correction images 200a, 200b, and 200c include respective arrangements of correction patterns defining the correction points which are used for detecting a distortion of the projection images. The arrangement of the correction patterns defines the coordinates on the projector memory, and serves as the pattern where arbitrary figure elements are arranged based on a predetermined rule. The arrangement of the correction patterns projected on the screen 102 is captured by the camera 160, and a group of the correction points are extracted and the coordinates thereof are detected. As a result, trapezoidal distortions and local distortions of the projection images projected by the projectors 150a, 150b, and 150c can be detected. Therefore, in order to perform (realize) a highly-accurate correction process, it is desired that the arrangement of the correction patterns are included in the screen 102 without any loss of the correction patterns.

The correction images 200a, 200b, and 200c are generated based on given conditions. In this regard, the correction condition receiving section 118 in the first embodiment receives the input of the shape characteristics such as the aspect ratio of the screen 102 on which images are projected and the installation conditions such as the aspect ratio of the projectable area of the projector, the number of projectors to be connected, a ratio of the overlapped area to the projection image, a projection manner (e.g., in one line in the horizontal direction, in one line in the vertical direction, or how many rows and columns) from a user.

However, it is not always necessary that all of the above condition values be given as the input values. Some of the condition values may be given as the default values or may be determined by the image processing apparatus 110. For example, the aspect ratio of the projectors may be determined based on the setting information of the screen resolution in the operating system.

The correction scene generation section 120 in the first embodiment generates the correction images 200a, 200b, and 200c for the respective projectors 150a, 150b, and 150c based on the input conditions values, and stores the correction images 200a, 200b, and 200c into the correction image storage section 122. In this case, the correction scene generation section 120 generates the correction images for the projectors which are in charge of the outer sides of the screen 102, in a manner so that the correction images include respective margin parts and the margin parts being formed outside the arrangement of the correction patterns as illustrated in FIGS. 5A through 5C, so that the arrangement of the correction patterns can be projected within the screen 102 while having the overlapped areas of the arrangement of the correction patterns between the adjacent projectors based on the given installation conditions and the shape characteristics. The margin parts typically have a background color.

However, the margin parts may include a pattern as long as the pattern does not affect the extraction of the arrangement of the correction patterns. Further, in the example of FIGS. 5A through 5C, the projection images are arranged in a line in the horizontal direction so as to form a horizontally long screen. Therefore, all the projectors 150a, 150b, and 150c include areas to be projected outside the screen on the upper and lower sides of the projection images. Therefore, all the projectors 150a, 150b, and 150c serve as the projectors in charge of the outer sides of the screen 102.

Further, a method of setting the margin parts is based on the following method. In a case where the conditions values of the aspect ratio of the screen 102, the aspect ratio of the projectors 150, the number of the connected projectors 150, and the ratio of the overlapped area to be secured between the adjacent projectors. 150 are given, when the projection images having at least the ratio of the overlapped area are projected under the given conditions, the areas to be included within the screen 102 from among the projectable areas of the projectors 150a, 150b, and 150c are determined.

Further, it is desired that all the parts where the characteristic points are extracted are included in the determined areas. The corresponding areas in the correction images are referred to as "correction areas", which are illustrated in dashed-dotted lines in FIGS. 5A through 5C. In the example of FIGS. 5A through 5C, the margin parts are formed on the upper and lower sides of the correction areas in the whole projectable areas.

It is possible to use the correction images where the correction patterns are arranged in the lattice manner in the correction areas. However, in a preferred embodiment, the margin parts may be additionally formed outside the correction pattern areas (defined in the dotted lines in FIGS. 5A through 5C) where the arrangement of the correction patterns are formed in the correction areas. Further, in the correction images corresponding to the projectors 150 that are in charge of the areas of the corners of the screen 102, the four-corner markers are formed on the outer sides of the correction pattern areas.

When the projectors 150 are arranged in a line in the horizontal direction, the left-end and the right-end projectors 150a and 150c become the projectors in charge of the areas of the corners. The four-corner markers define the reference points as the marks when the correction images are fit to the four corners of the screen 102. A user may adjust the projection angles and zooms of the projectors 150a, 150b, and 150c in a manner so that the projected four-corner markers are arranged within the screen 102.

In a first correction image 200a, which is illustrated in FIG. 5A, for a first projector 150a, a whole projection area of the first projector 150a is divided into 16 blocks in the horizontal direction and 10 blocks in the vertical direction (to form a set of 16×10 blocks, see FIG. 5A). In the set of 16×10 blocks, a new set of 14×6 blocks, in which the 14 blocks are right-justified blocks in the horizontal direction in the 16 blocks and the 6 blocks are center-justified blocks in the vertical direction in the 10 blocks, is selected.

Further, the set of 14×6 blocks is divided into new 21 sets, where each of the 21 sets has 2×2 blocks. In each center of the 21 sets of 2×2 blocks, a circle is formed, so that 21 circles are arranged in a lattice manner.

Further, in a second correction image 200b, which is illustrated in FIG. 5B, for a second projector 150b, a whole projection area of the second projector 150b is divided into 16 blocks in the horizontal direction and 10 blocks in the vertical direction (to form a set of 16×10 blocks). In the set of 16×10 blocks, a new set of 16×6 blocks, in which the 6 blocks are center-justified blocks in the vertical direction in the 10 blocks, is selected. Further, the set of 16×6 blocks is divided into new 24 sets, where each of the 24 sets has 2×2 blocks. In each center of the 24 sets of 2×2 blocks, a circle is formed, so that 24 circles are arranged in a lattice manner.

Further, in a third correction image 200c, which is illustrated in FIG. 5C, for a third projector 150c, a whole projection area of the third projector 150c is divided into 16 blocks in the horizontal direction and 10 blocks in the vertical direction (to form a set of 16×10 blocks). In the set of 16×10 blocks, a new set of 14×6 blocks, in which the 14 blocks are left-justified blocks in the horizontal direction in the 16 blocks and the 6 blocks are center-justified blocks in the vertical direction in the 10 blocks, is selected. Further, the set of 14×6 blocks is divided into new 21 sets, each of the 21 sets has 2×2 blocks. In each center of the 21 sets of 2×2 blocks, a circle is formed, so that 21 circles are arranged in a lattice manner.

Further, in the example of FIGS. 5A through 5C, the four-corner markers are disposed in a manner so that two of the four-corner markers are disposed at the left top corner block and the left bottom corner block in a set of 16×8 blocks in which the top and bottom blocks in the vertical direction are excluded in the set of 16×10 blocks in the first correction image 200a which corresponds to the left end image.

Further, another two of the four-corner markers are disposed at the right top corner block and the right bottom corner block in a set of 16×8 blocks in which the top and bottom blocks in the vertical direction are excluded in the set of 16×10 blocks in the first correction image 200c which corresponds to the right end image.

Further, note that the generation parameters, which are used for generating such correction images having the disposed positions of the arranged correction patterns and the disposed positions of the four-corner markers, may be calculated based on given conditions by using a predetermined calculation formula, or may be, for example, acquired by reading generation parameters by using an input condition as a key, the generation parameters corresponding to combinations of typical conditions prepared by the supplier (manufacturer) in advance.

Further, in another embodiment, the correction images corresponding to combinations of typical conditions may be generated by the supplier and stored in association with the combinations, so that a user can read and acquire appropriate correction images by inputting a condition as a key.

Further, in a preferable embodiment, in order to maintain the extraction accuracy, the size of the circles defining the correction points is set to a constant value regardless of the size of the margin parts, so that the increase/decrease of the numbers of the circle patterns in the row and column directions can correspond to the size of the margin parts.

In the correction process of the projection system 100, based on the reference points of the four-corner markers which are extracted from the correction captured image described above, a projection target area, to which the image as a whole is to be projected by the projectors 150a, 150b, and 150c, is defined. The compensation coefficient calculation section 130 calculates the compensation coefficients for the projectors 150a, 150b, and 150c so that the content image can be projected to the projection target area which is defined based on the reference points at the four corners.

Further, in a preferred embodiment, a user interface is provided for fine adjustment. Namely, it is possible to finely adjust the positions of the four reference points which define the four corners of the projection target area so as to fit the actual four corners of the screen 102 by receiving instructions to move the reference points defining the projection target area while the content image is projected on the projection target area.

By visually repeating the fine adjustment by a user, finally, it becomes possible to fit the projection target area to the area defined by the four corners of the screen 102, so that the content image can be projected onto the screen 102 in just the right size.

In the first embodiment, the correction images 200a, 200b, and 200c are generated having the margin parts which are formed outside of the correction areas in accordance with the shape characteristics of (the projection area provided by) the screen 102 and the installation conditions of the projectors 150a, 150b, and 150c. Accordingly, it becomes possible for a user to project the correction images 200a, 200b, and 200c in a manner so that the arrangement of all the correction patterns are included within the screen 102 as illustrated in FIG. 6A even in a case where it is desired to project the content image onto the screen in just the right size when the aspect ratio of the screen is higher than the aspect ratio which is determined when the projection images of the projectors are simply connected without forming any overlapped areas therebetween.

Further, it is possible to project in a manner so that the arrangement of the correction patterns is included within the screen 102. Therefore, protruded deformation due to an uneven surface and adhesion to an external pattern are unlikely to occur and wrong detection of the correction pattern is unlikely to occur, so that the correction accuracy can be improved.

Further, in a preferred embodiment, the four-corner markers are further provided in the periphery parts of the correction patterns. Therefore, the four-corner markers make it easier for a user to roughly know the initial position of the area which becomes a projection target after compensation. Namely, the user can adjust the zoom and the projection angles of the projectors by using the tour-corner markers as a good indication, so that the operation by the user can be easier.

Further, in a preferred embodiment, in the correction images, the margin parts are further provided outside the correction pattern areas, and the four-corner markers are formed in the parts as well. Due to the formed four-corner markers, by roughly setting the position of the four-corner markers, even in a case of using an ultra-short focus projector, as illustrated in FIG. 6B, it becomes easier to project the correction patterns within the screen 102 while it is unlikely to occur that an image protrudes outside the screen 102 or that a dent of the projectable area where no image can be projected on the screen is formed.

In the above description, a case is described with reference to FIGS. 5A through C. Note that a specific configuration of the correction patterns and the four-corner markers in the present invention is not limited to the configuration described above. In this regard, as the correction pattern, in a view of extracting the correction points in a robust manner, it is desired to use the circular patterns so that circular shapes having contrast relative to the background are arranged in a two-dimensional lattice manner. However, in another embodiment, various patterns such as a dot pattern, a checkered pattern, a lattice pattern, etc., may be used.

Further, a method of dividing the whole projection area is not limited to the method described above. For example, the number of divided blocks and the method of dividing into the blocks may be determined based on the desired accuracy and the performance of the image processing apparatus 110, Further, as the shape of the four-corner markers, any appropriate shape such as a circular shape may be used.

Further, in the above embodiment, a case is described where the arrangements of the correction patterns and the four-corner markers are disposed in the same correction images. However, as described below in detail, it is possible to separately provide the correction images including the correction patterns and the correction images including the four-corner markers as long as the coordinates of the characteristic points can be integrated into a single coordinate system.

Overall Process Flow in the First Embodiment

Figure 7:
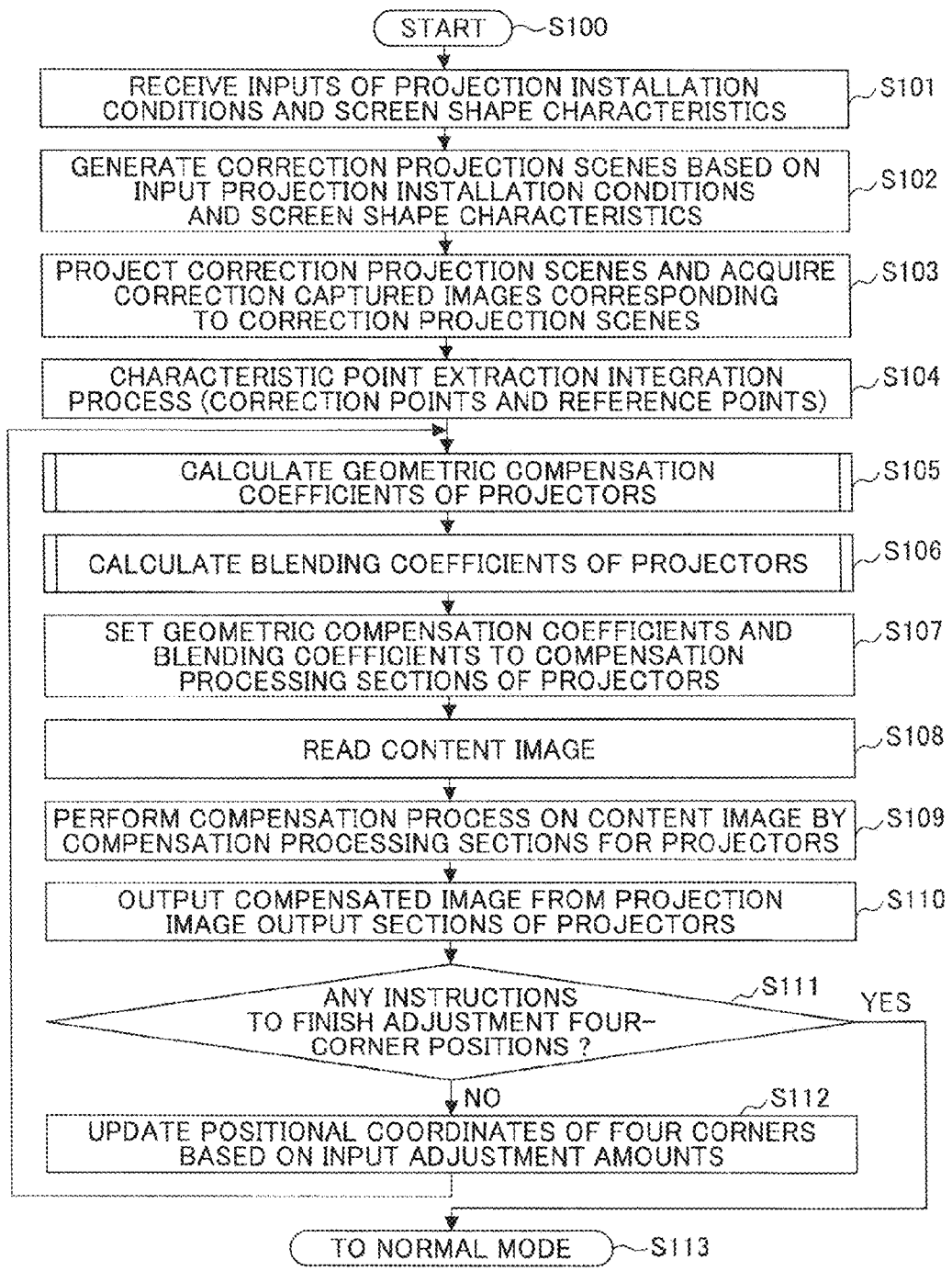
FIG. 7 is a flowchart of an overall process of a correction process according to the first embodiment.

In the following, an overall process flow of the correction process according to the first embodiment is described with reference to a flowchart of FIG. 7. FIG. 7 is a flowchart of an example overall correction process according to the first embodiment. The process in FIG. 7 starts from step S100 in response to an instruction to start the correction process from a user.

In step S101, the image processing apparatus 110 receives inputs of the installation conditions including, for example, the number of connected projectors "T" and the shape characteristics including, for example, the aspect ratio of the screen "M:N" from a user. The inputs are received from the input device 170 by displaying a condition input screen on a display connected to the image processing apparatus 110.

In step S102, as described above, the image processing apparatus 110 generates the correction images based on the installation conditions of the projectors and the shape characteristics of the screen which are input as described above, and further generates the correction projection scenes.

In step S103, the image processing apparatus 110 causes the projectors 150a, 150b, and 150c to sequentially project the generated correction projection scenes, and acquires the correction captured images that are captured by the camera 160, the correction captured images corresponding to the correction projection scenes.

Figure 8:
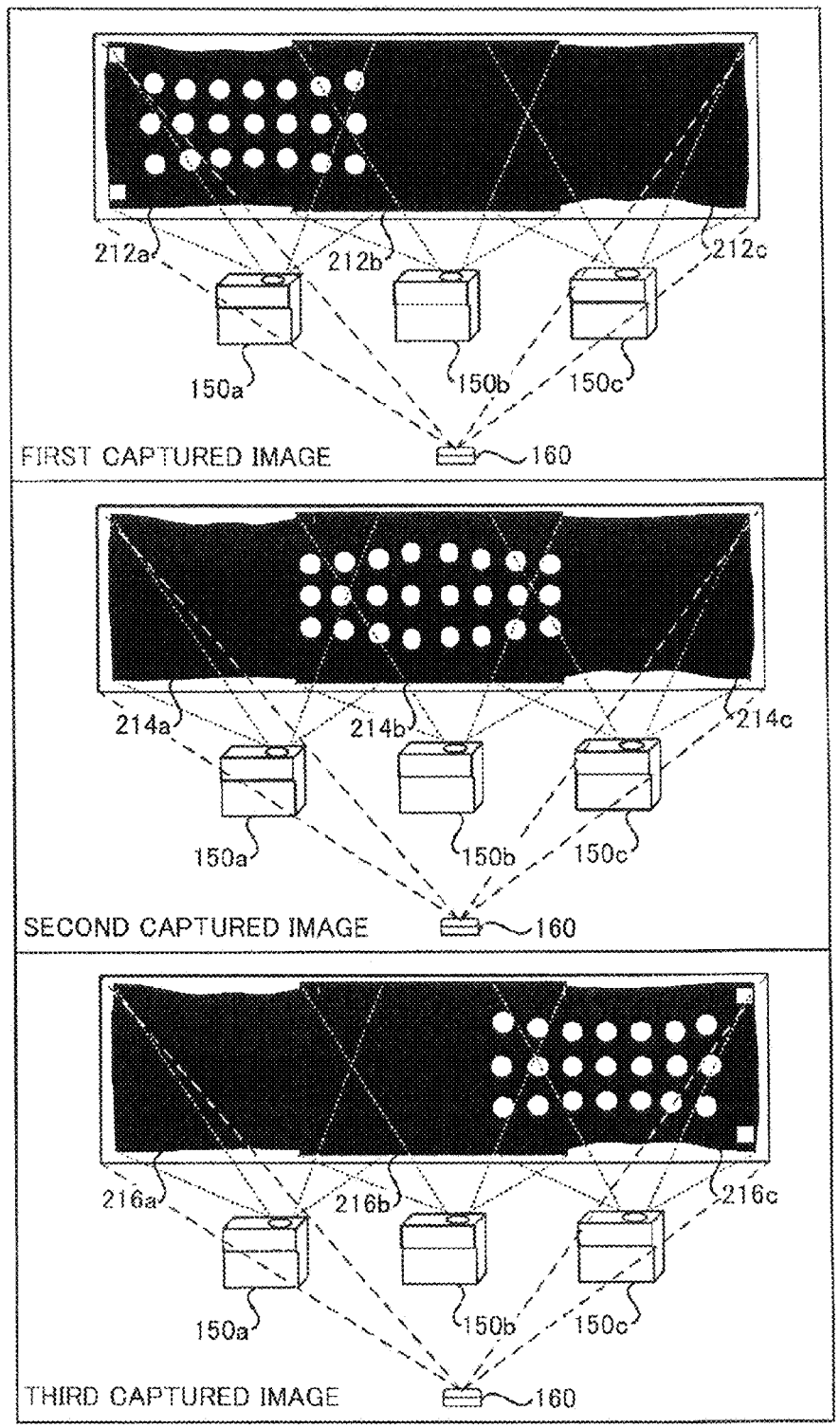
FIG. 8 is a drawing illustrating an example of correction projection scenes which are projected by a plurality of projectors caused by an image processing apparatus according to the first embodiment.

FIG. 8 illustrates examples of the correction projection scenes which are projected by the projectors 150a, 150b, and 150c caused by the image processing apparatus 110. More specifically, FIG. 8 illustrates three correction projection scenes which are sequentially projected by the projectors 150a, 150b, and 150c, the three correction projection scenes corresponding to the three correction images in FIGS. 5A, 5B, and 5C.

In the example of FIG. 8, in a first correction projection scene of a first capturing, the image processing apparatus 110 causes the first projector 150a to project a first correction image 212a illustrated in FIG. 5A and causes the second and the third projectors 150b and 150c to project no images. In a second correction projection scene of a second capturing and a third correction projection scene of a third capturing, similar to the a first correction projection scene of the first capturing, the second correction image and the third correction image are projected from the second projector 150b and the third projector 150c, respectively. While one projector projects the correction image, the other projectors do not project any image.

The user fixes the camera 160 by using a tripod stand or the like, so that the whole of the projection images 212, 214, and 216, which are projected by the all the connected projectors 150a, 150b, and 150c, can be captured within the angle of view of the camera 160. Then, the user uses the camera 160 to capture plural images (correction captured images) in each of the above steps according to, for example, guidance provided by the image processing apparatus 110. The correction captured images corresponding to the correction projection scenes from the camera 160 are collectively or sequentially acquired by the image processing apparatus 110, and the process goes to step S104.

In step S104, the image processing apparatus 110 performs a characteristic point extraction integration process to extract the characteristic points from the acquired one or more correction captured images. In the characteristic point extraction integration process, the coordinate positions of the sets of the correction points and the reference points determined by the four-corner markers of the projectors are extracted in the integrated coordinate system.

More specifically, in the characteristic point extraction integration process, first, the image processing apparatus 110 detects the (circular) correction patterns of the projections images of the projectors 150a, 150b, and 150c in the correction captured images. Then, the image processing apparatus 110 extracts the geometric center coordinates of the correction patterns in the coordinate system of, the correction captured images as the coordinates of the correction points (having, for example, decimal point accuracy).

In this case, the circular geometric center coordinates can be calculated by, for example, binarizing the image and cutting off a mass of white pixels using a pattern matching, etc., and acquiring the geometric center coordinates of the mass of the white pixels. Similarly, the geometric center coordinates of the four-corner markers in the coordinate systems in the correction captured images can be detected based on the correction captured images, so that the geometric center coordinates are extracted as the coordinates of the reference points.

In the following description, the symbols "$L_1$, $L_2$, and $L_3$" denote the coordinates of the correction points ("correction point coordinates") of first, second, and third projectors 150a, 150b, and 150c. Further, the symbols "$M_1$ and $M_2$" denote the coordinates of the reference points of the four-corner markers ("reference point coordinates").

In the embodiment, the images are captured while the camera 160 is fixed. Therefore, the acquired correction point coordinates "$L_1$, $L_2$, and $L_3$" and reference point coordinates "$M_1$ and $M_2$" are coordinates in a single coordinate system ("integrated coordinate system"). Further, based on the reference point coordinates "$M_1$ and $M_2$" of the four-corner markers, an area where it is thought that correct correction points are included in the integrated coordinate system is determined. Therefore, it becomes possible to easily exclude the correction point which is wrongly detected (when, for example, the correction point is wrongly detected due to a pattern outside the screen) by simply referring to the coordinate positions of the correction points.

In step S105, although details are described below, based on the calculated correction point coordinates "$L_1$, $L_2$, and $L_3$" and reference point coordinates "$M_1$ and $M_2$", the geometric compensation coefficients of the projectors are calculated.

In step S106, although details are described below, the image processing apparatus 110 calculates the blending coefficients of the projectors.

In step S107, the image processing apparatus 110 sets the geometric compensation coefficients and the blending coefficients for the projectors 150a, 150b, and 150c calculated in steps S105 and S106 into the respective compensation processing sections 114a, 114b, and 114c.

In step S108, the image processing apparatus 110 reads the content image to be projected.

In step S109, the compensation processing sections 114a, 114b, and 114c perform the compensation process corresponding to the projectors 150a, 150b, and 150c on the content image. Upon starting the compensation process, the switching sections 124a, 124b, and 124c perform switching operations so that the outputs from the compensation processing sections 114a, 114b, and 114c can be input to the projection image output sections 116a, 116b, and 116c, respectively, and the mode is set to the projection mode.

In step S110, the image processing apparatus 110 causes the projection image output sections 116a, 116b, and 116c to output the respective compensated projection images for the projectors 150a, 150b, and 150c. By doing this, it becomes possible to project the content image as a whole in the screen 102.

In the beginning of the projection mode, a user interface, which is for the adjustment operations so that the four corners of the projection area of the content image can fit the screen 102 in just the right size, is displayed on a part of the screen projected by the projectors 150a, 150b, and 150c or a display screen which is separately provided. The user uses the user interface and visually performs the fine adjustment on the positions of the four corners of the projection target area on which the content image is projected.

When determining that content image fits the screen in just the right size, the user sends an instruction indicating the completion of the adjustment operations. In step S111, the image processing apparatus 110 determines whether to receive the instruction indicating the completion of the adjustment operations from the user.

In step S111, when it is determined that the instruction indicating the completion of the adjustment operations of the four-corner positions is not received (NO in step S111), the process goes to step S112. In step S112, based on the adjustment amounts which are input via the user interface, the image processing apparatus 110 updates positional coordinates of the reference points defining the four corners of the projection target area, and then, the process loops back to step S105.

By doing this, in a state where the adjustment result has been reflected, the geometric compensation coefficients and the blending coefficients for the projectors 150a, 150b, and 150c are re-calculated. On the other hand, in step S111, when it is determined that the instruction indicating the completion of the adjustment operations of the four-corner positions is received (YES in step S111), the process goes to step S113 to complete the adjustment operations and it goes to normal projection mode.

Calculation of Geometric Compensation Coefficients

Figure 9:
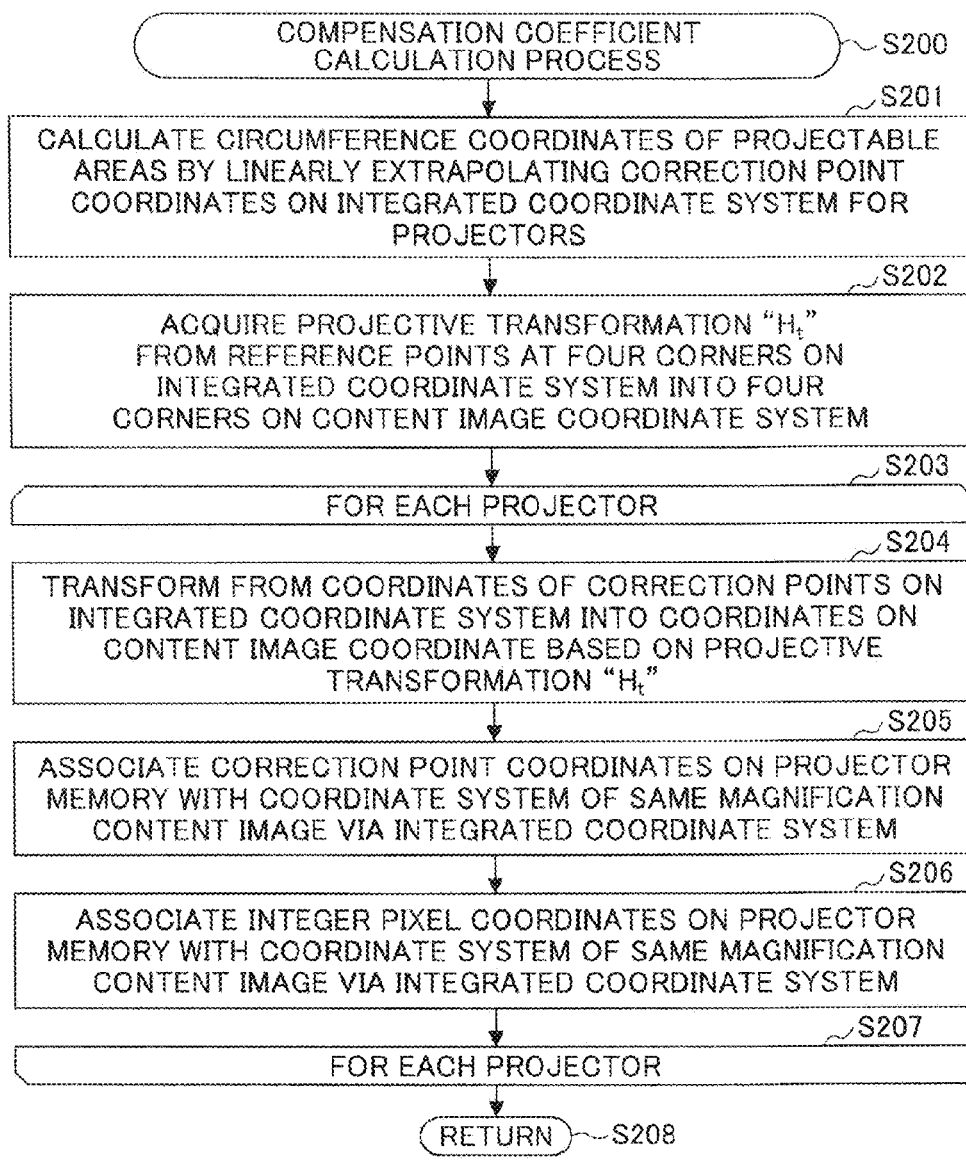
FIG. 9 is a flowchart illustrating an example calculation process of calculating a geometric compensation coefficient by a geometric compensation coefficient calculation part according to an embodiment.

In the following, details of a calculation process of calculating geometric compensation coefficients of the projectors 150a, 150b, and 150c are described with reference to FIGS. 9 through 12 and 14A. FIG. 9 is a flowchart of the calculation process of calculating geometric compensation coefficients performed by the geometric compensation coefficient calculation section 134 according to an embodiment. The process in FIG. 9 is called in step S105 of FIG. 7 and starts from step S200.

In step S201, the geometric compensation coefficient calculation section 134 calculates circumference coordinates of the projectable areas of the projectors 150a, 150b, and 150c by linearly extrapolating the correction point coordinates "$L_1$, $L_2$, and $L_3$" on the integrated coordinate system for the projectors 150a, 150b, and 150c.

Figure 10B:
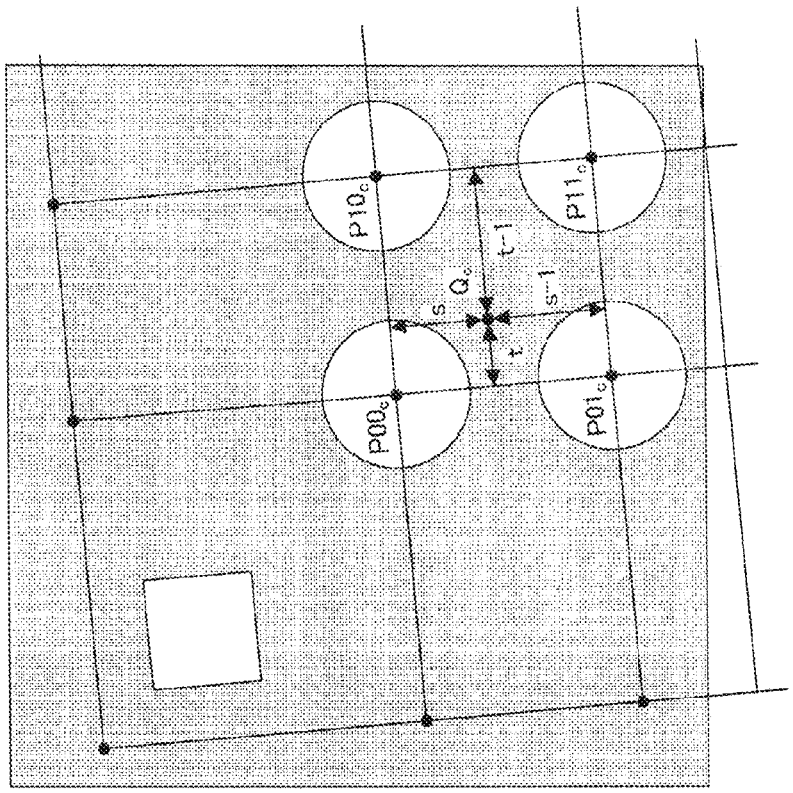
FIGS. 10A and 10B are drawings illustrating a method of calculating circumference coordinates of a projectable area by linear extrapolation using integrated correction point coordinates.
Figure 10A:
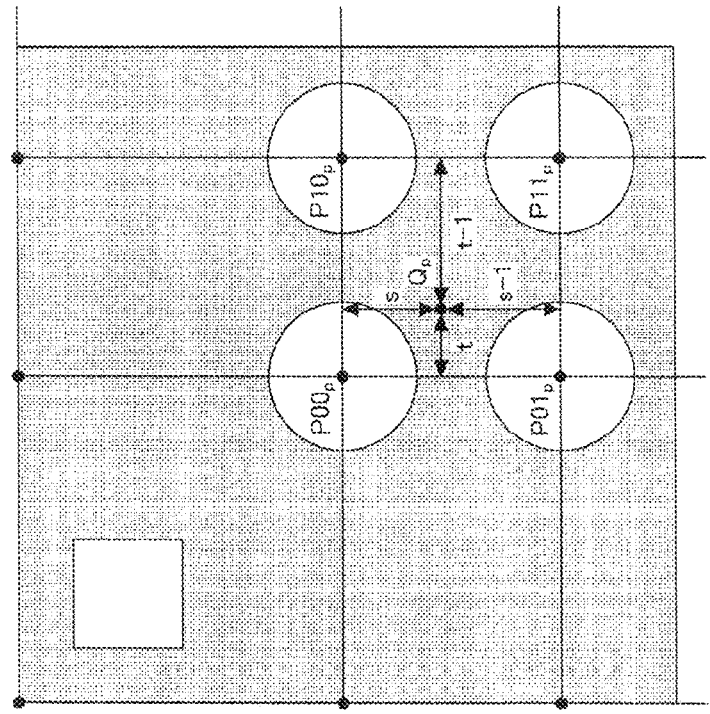

FIGS. 10A and 10B illustrate a calculation method of calculating the circumference coordinates of the projectable areas based on the linear extrapolation using the integrated correction point coordinates. More specifically, FIG. 10A illustrates the corrections points at the left top corner on the projector memory, and FIG. 10B illustrates the corresponding four correction points on the integrated coordinate system.

As illustrated in FIG. 10A, the circumference coordinates on the projector memory (the correction points at the four corners and on the four sides of the projection images of the projectors) are fixed at the positions which extrapolate a quadrilateral patch of the four correction points disposed in a circumference part (e.g., $P00_R$ through $P00_R$) (the positions corresponding to, for example, 1.5 times the distance between correction points).

As illustrated in FIG. 10B, the coordinates of the circumference pixels (corrections points on the four corners and on the four sides) corresponding to the projectable areas of the projectors in the integrated coordinate system can be calculated by linearly extrapolating from the corresponding four correction point coordinates disposed in the circumference part. In the same manner, the points on the integrated coordinate system corresponding to arbitrary coordinate points on the projector memory other than the circumference pixels (corrections points on the four corners and on the four sides) can be calculated (acquired) by linearly interpolating the extrapolating of the nearby four correction point coordinates.

Here, it is assumed that an arbitrary coordinate point "$Q_P$" on the projector memory is the point that is determined based on the four correction points "$P00_P$, $P10_P$, $P01^P$, and $P11_P$" by dividing internally in the x axis direction into $t:1-t$ ($0<t<1$) and dividing internally in the Y axis direction into $s:1-s$ ($0<s<1$). In this case, the point "$Q_C$" on the integrated coordinate system corresponding to the coordinate point "$Q_P$" can be calculated based on the coordinate vectors of the corresponding correction points "$P00_C$, $P10_C$, $P01_C$, and $P11_C$" and by using the following formula (1). In a case of the extrapolated points, the point "$Q_C$" can also be calculated by setting "t ($-1.5<t<0$)" and "s ($-1.5<s<0$)" and using the following formula (1).

$$Q_c=(1-s)((1-t)P00_C+tP10_C)+s((1-t)P01_C+tP11_C) \quad \text{formula (1)}$$

In the whole image, non-linear geometric distortion may be produced. However, in this case, the range of the quadrilateral patch having 2×2 correction points and the range determined by extrapolating toward the circumference by a predetermined amount are only a part of the whole image. Therefore, herein, it is assumed that the distortion in the ranges can be regarded as the liner distortion.

Further, in the embodiment described herein, a case is described where the corresponding point is calculated based on the linear interpolation using the above formula (1). However, in another embodiment, the point "$Q_P$" on the projector memory may be associated with the corresponding point "$Q_C$" based on a projective transformation by using two sets (pairs) of the four nearby correction points "$P00_C$, $P10_C$, $P01_C$, and $P11_C$" and "$P00_P$, $P01_P$, $P01^P$, and $P11_P$".

By performing the linear extrapolation described above for the projectors 150a, 150b, and 150c, it becomes possible to detect the projectable areas (i.e., the area in which a whole while image can be projected) of the projectors 150a, 150b, and 150c on the integrated coordinate system. Upper part of FIG. 11 illustrate three sets of correction points (while circles, black circles, and gray circles) and the projectable areas 304a, 304b, and 304c correspond to the projectors 150a, 150b, and 150c and detected on the integrated coordinate system 300.

The projectable area 304a of the first projector 150a is illustrated by a solid white line, the projectable area 304b of the second projector 150b is illustrated by a dashed white line, and the projectable area 304c of the third projector 150c is illustrated by a two-dot chain white line.

Figure 11:
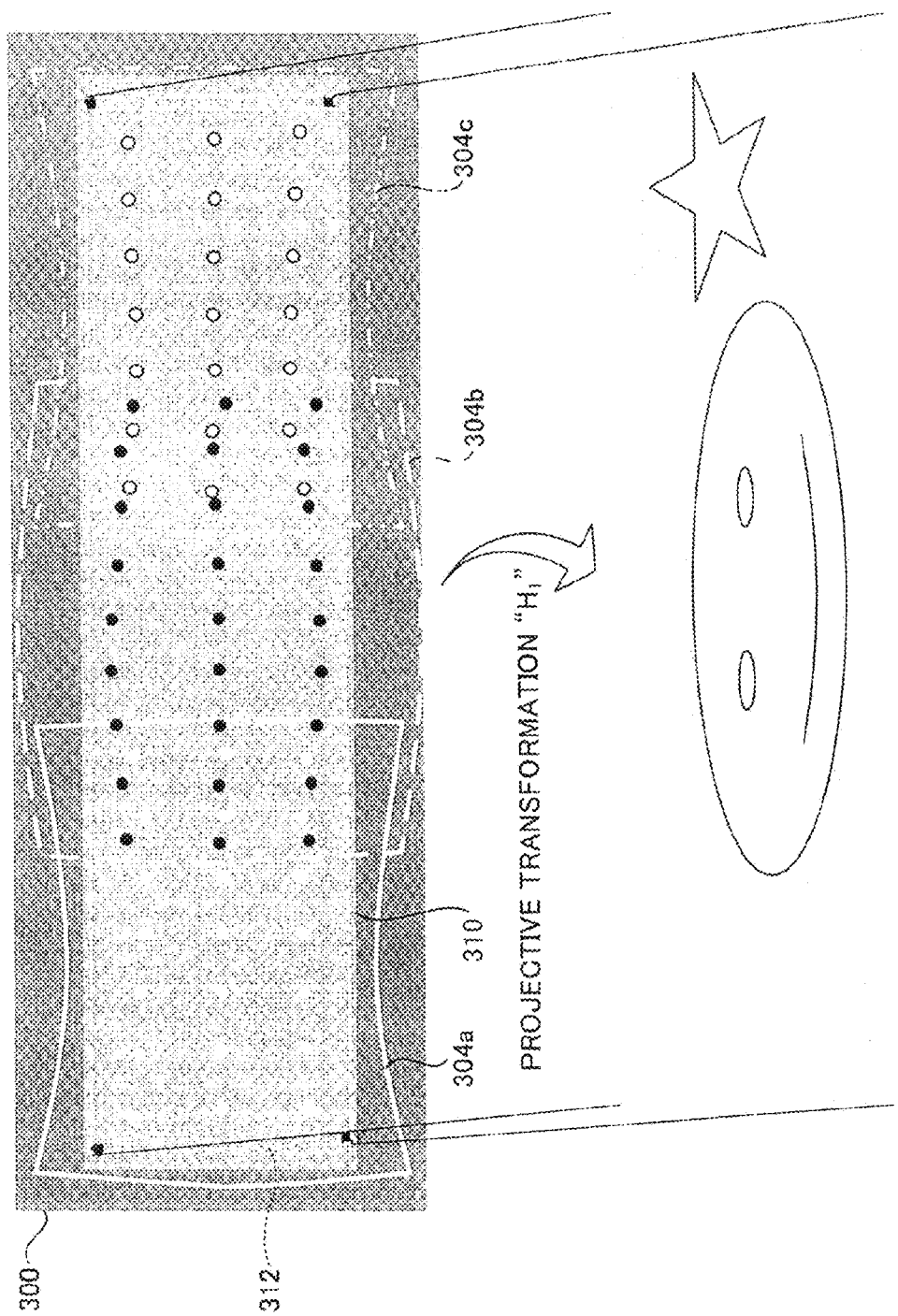
FIG. 11 is a drawing illustrating example mapping of the projectable areas, projection target areas, and content images of the three projectors on an integrated coordinate system after a first correction.

The gray area 310 on the integrated coordinate system 300 in upper part of FIG. 11 illustrates the area corresponding to the screen 102. An object is to project the content image so that the projected content image can fit the area 310 in just the right size. Here, it is desired that the area 310, which corresponds to the screen 102 to which the projection images are desired to fit in just the right size, is fully filled with the area which is the result of logical addition "OR" of the three projectable areas of the three projectors.

In this regard, after the first correction, as illustrated in upper part of FIG. 11, the content image is projected on a projection target area 312 which is a quadrilateral defined by the dotted lines connecting the reference points corresponding to the four-corner markers which are positioned to the four corners of the screen 102 by a coarse adjustment by the user (in this case, the shape of the projection target area 312 is not necessarily rectangular).

Referring back to FIG. 9, in step S202, the projective transformation is acquired to map the rectangular content image into the projection target area 312 which is a quadrilateral defined by the dotted lines connecting the reference point coordinates of the four-corner markers in upper part of FIG. 11. Here, the symbol "$H_t$" denotes the projective transformation from the projection target area 312 into the content image.

The geometric compensation coefficient calculation section 134 calculates the coefficients to be used in the first projective transformation "$H_1$" (t=1 denotes the first time) from the projection target area 312 into the content image based on the coordinates of the reference points of the four-corner marker defining the projection target area 312 and the coordinates of the four corners of the content image.

The transformation formula of the projective transformation "$H_1$" is given by the following formulas (2). By multiplying both sides by the denominators and arranging the formulas, the formulas (3) which are developed to fit a first-order polynomial are obtained.

$$u = x*a + y*b + c/x*g + y*h + 1$$

$$v = x*d + y*e + f/x*g + y*h + 1 \qquad \text{formula (2)}$$

$$u = x*a + y*b + c - x*g*u - y*h*u$$

$$v = x*d + y*e + f - x*g*v - y*h*v \qquad \text{formula (3)}$$

In the above formulas (2) and (3), the symbols "x" and "y" denote the coordinates on the integrated coordinate system before the transformation, and the symbols "u" and "v" denote the coordinates on the coordinate system of the content image after the transformation. Further, the eight coefficients "a" through "h" indicate the projective transformation coefficients.

In the above formulas, in order to calculate eight projective transformation coefficients which are unknown, it is necessary to have at least eight simultaneous equations. However, eight simultaneous equations can be generated based on the relationships of the reference points of four-corner markers and the coordinate points at the four corners in the content image. Therefore, it becomes possible to acquire the eight coefficients "a" through "h" by solving the generated eight simultaneous equations based on the relationships described above.

Referring back to FIG. 9, in the loop from step S203 to step S207, the processes in steps S204 through S206 are executed for each of the projectors, so that the geometric compensation coefficients of the projectors can be acquired.

In step S204, the geometric compensation coefficient calculation section 134 transforms the coordinates "$L_i$" of the correction points on the integrated coordinate system into the coordinates in the coordinate system of the content image based on the projective transformation "$H_t$" (t=1 in the first time).

Hereinafter, the content image on the integrated coordinate system and attached to the projection target area 312 is referred to as a "projected content image". On the other hand, the content image which is the original image of the "projected content image" is referred to as a "same magnification content image".

In step S205, the geometric compensation coefficient calculation section 134 associates the correction point coordinates on the projector memory with the pixel positions of the coordinate system of the same magnification content image via the integrated coordinate system.

In step S206, the geometric compensation coefficient calculation section 134 associates the integer pixel coordinates on the projector memory with pixel positions of the coordinate system of the same magnification content image via the integrated coordinate system by performing the linear interpolation.

The geometric compensation coefficients, which are calculated by performing the processes in steps S204 through S206, associate the coordinates on the projector memory with the pixel positions on the same magnification content image corresponding to the positions on the projected content image.

Figure 12:
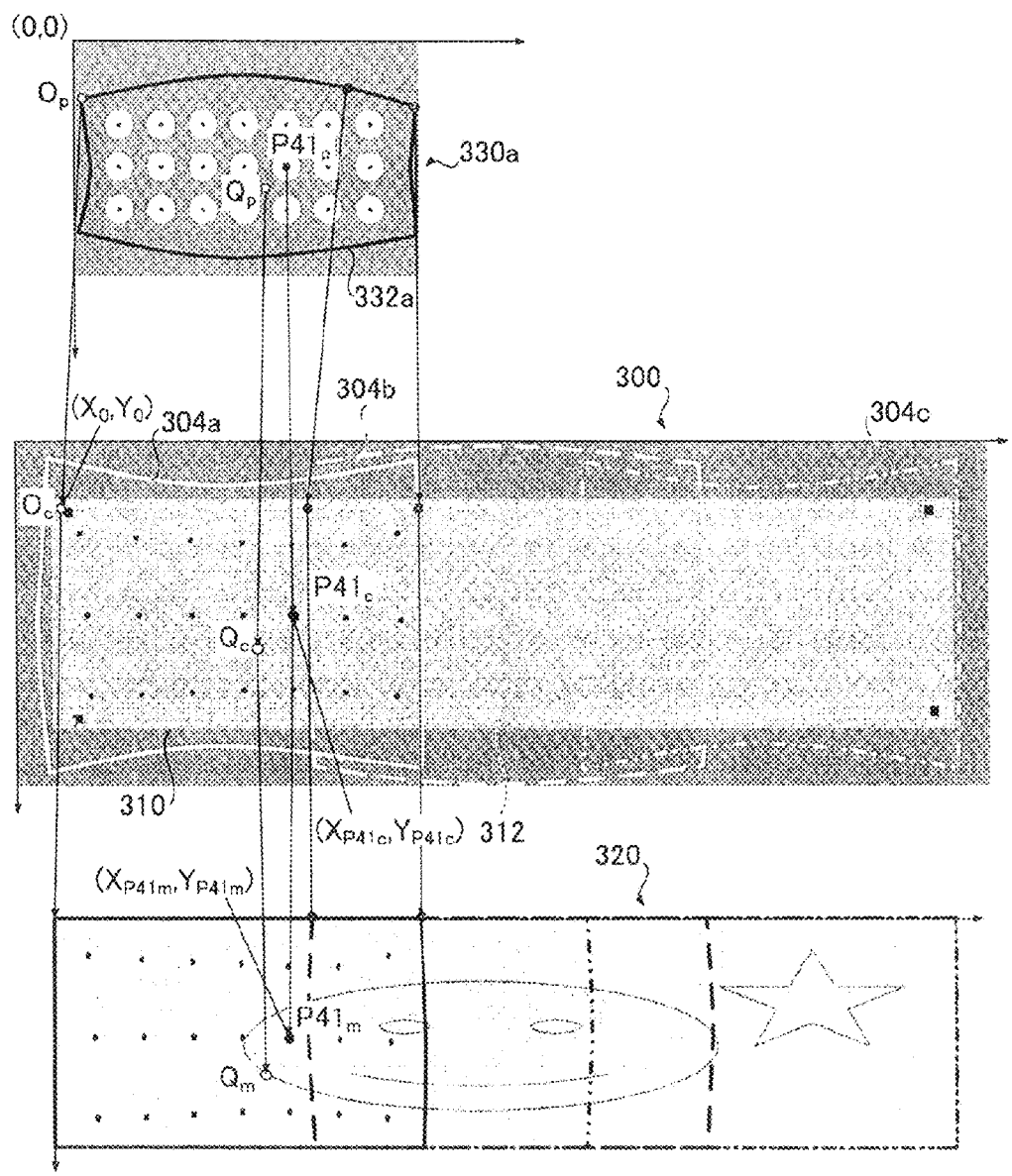
FIG. 12 is a drawing illustrating relationships of coordinates on a projector memory after the first correction relative to pixel positions of a same magnification content image which corresponds to positions of the projection content image.

Here, with reference to FIG. 12, an example is described based on one correction point "$P41_P$" which is on the projector memory 330*a*. Relative to the correction point "$P41_P$" on the projector memory 330*a*, the corresponding point "$P41_C$ ($X_{P41C}$, $Y_{P41C}$)" on the integrated coordinate system 300 is extracted. Further, the projection target area 312 of a quadrilateral is mapped to the content image.

Therefore, as illustrated in FIG. 12, relative to the coordinate position "$P41_C$" on the integrated coordinate system 300, the corresponding pixel position "$P41_m$ ($X_{P41m}$, $Y_{P41m}$)" on the same magnification content image is further determined.

Specifically, when the coordinates of the origin at the left top of the projected content image which is mapped on the integrated coordinate system in FIG. 12 are given as ($X_0$, $Y_0$), the corresponding pixel position "$P41_m$ ($X_{P41m}$, $Y_{P41m}$)", which is on the same magnification content image, to be projected at this correction point on the integrated coordinate system can be calculated from the coordinates "$P41_C$ ($X_{P41C}$, $Y_{P41C}$)" of the point "$P41_C$" on the integrated coordinate system 300 by using the following formula (4).

$$(X_{P41m}, Y_{P41m}) = H_1(X_{P41C} - X_0, Y_{P41C} - Y_0) \qquad \text{formula (4)}$$

In the same manner, as for all the correction points "$P_{ijP}$" other than the correction point "$P41_P$" on the projector memory, the corresponding pixel positions on the same magnification content image can also be calculated. As for the arbitrary coordinates other the correction points on the projector memory, by using the method described with reference to FIGS. 10A and 10B, namely by performing linear interpolation (interpolation, or extrapolation for a circumference part) on the corresponding pixel positions on the content image of nearby 2×2 correction points, it becomes possible to calculate the corresponding pixel positions on the same magnification content image. By doing this, the pixel positions in the area that the first projector 150*a* is in charge of in the content image are associated with the pixels of a predetermined area 332*a* on the projector memory 330*a*.

FIG. 14A illustrates an example data structure of the geometric compensation coefficients of one projector calculated in the process in steps S204 through S206. As illustrated in FIG. 14A, the corresponding pixels positions on the same magnification content image relative to all the pixels of the projector memory acquired as described above are geometric compensation coefficients.

The loop from step S203 to step S207 is repeated based on the number of the projectors, so that the integer pixel coordinates on the projector memory are associated with the coordinate system of the same magnification content image for all the projectors, and the process goes to step S208. In step S208, this process ends and the process goes back to the step from which this process is called. By doing this, the geometric compensation coefficients of all the projectors 150*a*, 150*b*, and 150*c* can be prepared.

In the embodiment described above, a case is described where as the geometric compensation coefficients, the corresponding pixel positions on the same magnification content image relative to all the pixels of the projection memory are acquired. Note that the present invention is not limited to this configuration.

In another embodiment, as the geometric compensation coefficients, the pixel positions "$Pij_m$" relative to the correction points "$Pij_P$" on the projection memory may be acquired, and as for the coordinates other than the correction points, that the compensation processing section 114, described below, may calculate on a quadrilateral patch basis by performing the projective transformation or the linear transformation.

Calculation of Blending Coefficient

Figure 13:
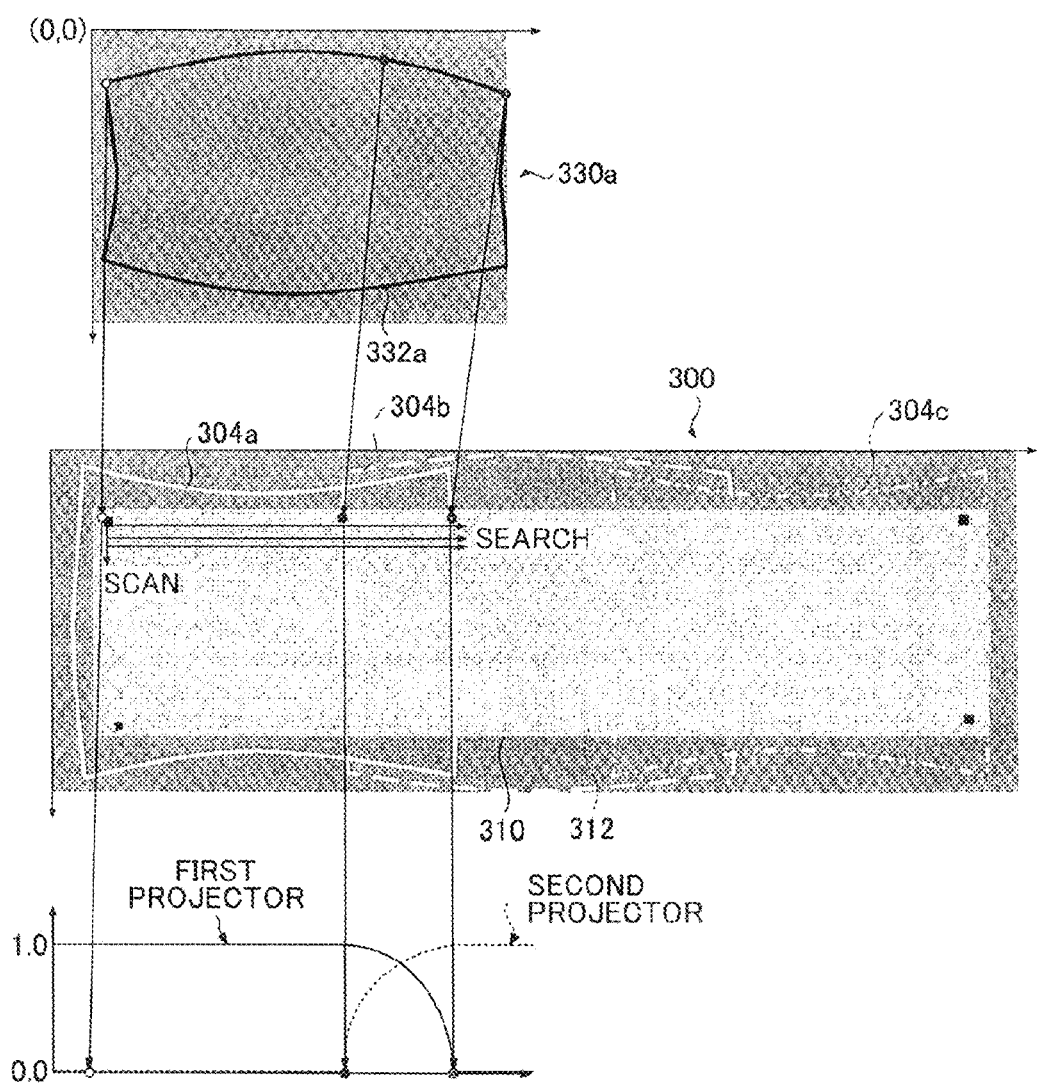
FIG. 13 is a drawing illustrating relationships of blending coefficients relative to coordinates on the projector memory.

In the following, details of a calculation process of calculating blending coefficients of the projectors 150*a*, 150*b*, and 150*c* are described with reference to FIGS. 13, 14A, and 14B. FIG. 13 is a drawing illustrating an association between the coordinates on the projector memory and the blending coefficients. In the process of calculating the blending coefficients, the process is performed on a projector basis, so that the blending coefficients of the projectors 150a, 150b, and 150c are acquired.

First, in the integrated coordinate system 300, the blending coefficient calculation section 136 detects an overlapped area of the projectable areas of the projectors adjacent to each other based on the circumference coordinates of the projectable areas of a target projector and another projector adjacent to the target projector. In this case, as illustrated in FIG. 13, from the top side of the projection target area 312 on the integrated coordinate system 300, a search is performed from the left origin (○) in the direction to the right, and the search is gradually lowered. By doing this, the start point (●) and the end point (◎) of the overlapped area between the first projector 150a and the second projector 150b can be detected.

Typically, a projector does not show linear input/output characteristics. In the calculation of the blending coefficients relative to the pixels corresponding to the overlapped area, a reverse compensation of the input/output characteristics is performed first so as to acquire linear compensation. Then, a weighting is applied in a manner so that the sum of the light amounts from the projectors on both sides is 1.

Specifically, as illustrated in the bottom graph of FIG. 13, as for the first projector, as for the pixels in the range from the origin (○) to the start point (●) of the overlapped area, the blending coefficient is set to the maximum value (i.e., 1). On the other hand, as for the pixels in the range from the start point (●) to the end point (◎) of the overlapped area, the blending coefficient is calculated by applying the reverse compensation to the input/output characteristics of the projectors in a manner such that the actual brightness is linearly decreased from 1.0 to 0 based on the horizontal distance from the start point (●).

The blending coefficient calculation section 136 associates the integer pixel coordinates on the projector memory with the blending coefficients allocated to the integer pixels nearest to the coordinates (decimal point) of the integrated coordinate system corresponded based on the data structure of FIG. 14A.

By the process described above, as illustrated in FIG. 14B, the blending coefficients of all the pixels of the projector memory for the projectors 150a, 150b, and 150c can be acquired. In the above description, a case of the overlapped area between the first projector 150a and the second projector 150b is described. In this regard, when the second projector 150b is the target projector, the blending coefficients of the two overlapped areas between the second projector 150b and the first projector 150a and between the second projector 150b and the third projector 150c are described.

Compensation Process

In the following, details of the compensation process based on the compensation coefficients are described with reference to FIGS. 14A, 14B, and 15. The geometric compensation coefficients of the projectors calculated by the geometric compensation coefficient calculation section 134 and the blending coefficients of the projectors calculated by the blending coefficient calculation section 136 are set in the compensation processing sections 114a, 114b, and 114c in step S107 of FIG. 7.

First, the compensation processing sections 114a, 114b, and 114 prepare association data in which all the pixels of the projection memory are associated with the corresponding pixel positions on the same magnification content image. The pixel positions relative to all the pixels of the projector memory as illustrated in FIG. 14A are already acquired by the process performed by the geometric compensation coefficient calculation section 134. Therefore, the compensation processing sections 114a, 114b, and 114 directly read the association data.

The compensation processing sections 114a, 114b, and 114 generate the intermediate images from the same magnification content image, which is to be projected, based on the pixel positions (decimal point) of the same magnification content image, which is to be projected, of the respective projection memories by using a pixel interpolation method such as bi-linear and bi-cubic interpolation, etc. The intermediate images are images where the geometric distortions detected in the content image are reversely deformed based on the geometric compensation coefficients. The compensation processing sections 114a, 114b, and 114 generate final projection image by multiplying the RGB pixel values of the generated intermediate images by the blending coefficients corresponded based on the association data.

FIG. 15 illustrates the compensation process based on the compensation coefficients described above. FIG. 15 illustrates the projection images 350a, 350b, and 350c which are finally acquired from the compensation processing sections 114a, 114b, and 114 based on the content images for the three projectors 150a, 150b, and 150c. As illustrated in FIG. 15, in the projection mode, those projection images 350a, 350b, and 350c are projected from the respective projectors 150a, 150b, and 150c. The projection images 350a, 350b, and 350c are appropriately overlapped on the screen 102 to be combined into a single projection image 352. In the first correction, the content image is projected on a quadrilateral projection target area defined (surrounded) by the reference points designated by the four-corner markers disposed in the screen 102.

User Interface for Adjustment

After the projection to the projection target area of the initial position is started, in a preferred embodiment, while the projection image as a whole is displayed, a user interface is provided for adjustment for adjusting the positions of the four corners of the projection target area (projection image as a whole). A user visually observes whether the position of the projection image as a whole is appropriate, and adjusts the four corners of the projection image as a whole to fit the screen 102. Typically, in the initial position, the four-corner markers are already disposed slightly inside the four corners of the screen 102. Therefore, the user may adjust so that the projection image as a whole is slightly expanded to the four corners of the screen 102 (see FIG. 15).

Figure 16:
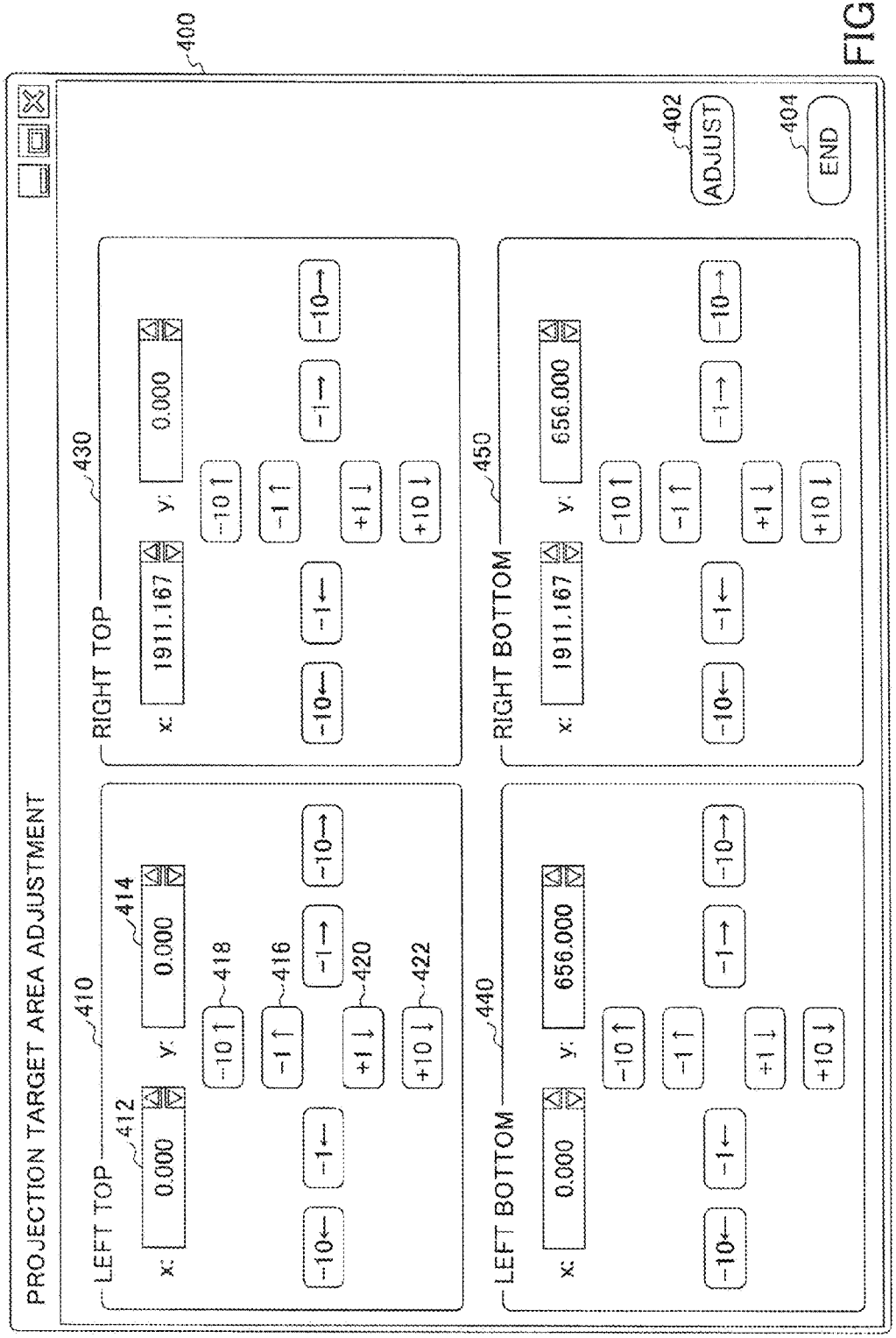
FIG. 16 is a drawing illustrating an example user interface screen for fine adjustment of four corner positions of the projection target area according to an embodiment.

FIG. 16 illustrates an example user interface for finely adjusting the positions of the four corners of the projection target area in a preferred embodiment. The screen 400 of FIG. 16 includes setting areas 410, 430, 440, and 450, which are for adjusting the coordinate values of the four corners, an "adjust" button 402 to receive an instruction to reflect the settings, and an "end" button 404 to receive an instruction to end the adjustment.

The setting area 410 corresponding to the left top is representatively described. The setting area 410 includes text boxes 412 and 414, which display the positional coordinates (x, y) of the corner, and buttons 416, 418, 420, and 422 which are user interface parts to receive the instructions to shift (move) the coordinate position of the corner. Here, the buttons for moving the coordinate position in the up-and-down direction are representatively described.

The coordinate system to be a reference for the fine adjustment is the integrated coordinate system. Further, to the user interface, specific coordinate values are input. Here, the vertical length in the integrated coordinate system (the average value of the vertical distance between two left four-corner markers and the vertical distance between two right four-corner markers) is scaled to fit the vertical distance (number of pixels) between the corresponding four-corner markers in the coordinate system of the image on the projector memory.

Further, on the coordinate system which is scaled as described above, the fine adjustment value is changed with a granularity of plural steps upward and downward (e.g., two steps of ±10 and ±1) by using the buttons 418, 416, 420, and 422. Otherwise, the coordinate values after fine adjustment may be directly input into the text boxes 412 and 414.

After the fine adjustment values of the positions of the four corners of the projection target area are input as described above, when the "adjust" button is pressed, the coordinates of the reference points defining the projection target area in the integrated coordinate system are updated. The updated coordinates of the reference points are values in the scale of the integrated coordinate system converted from the coordinate values input as described above. After that, continuously, the geometric compensation coefficients are re-calculated and the blending coefficients are re-calculated.

Figure 17:
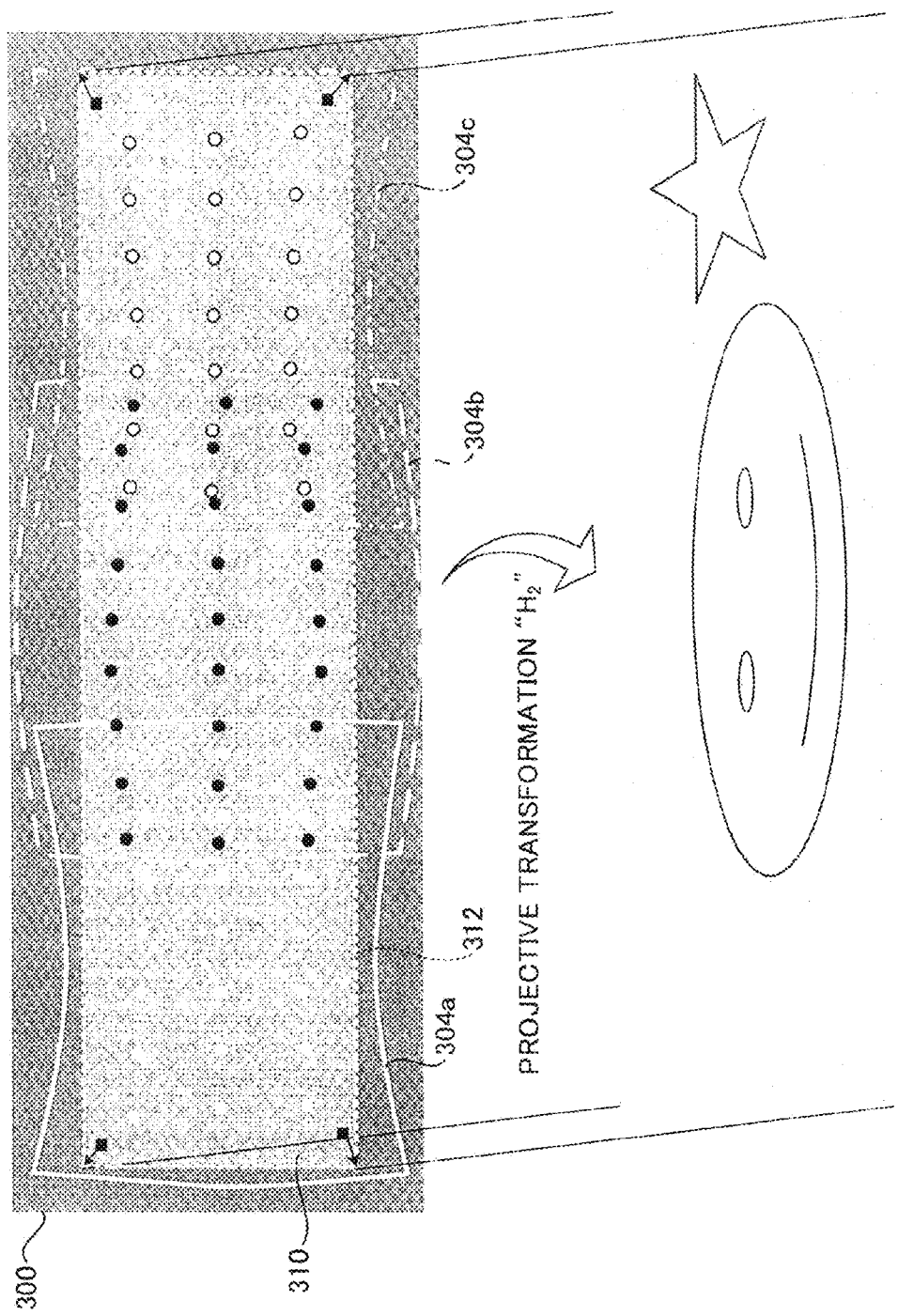
FIG. 17 is a drawing illustrating example mapping of the projectable areas, the projection target areas, and the same magnification content images of the three projectors onto the integrated coordinate system after adjustment.

FIG. 17 illustrates the projection target area after the fine adjustment by the user input. Typically, as the fine adjustment step is repeated on the integrated coordinate system, the positions of the four corners of the projection target area 312 gradually approach the four corners of the (gray) area 310 corresponding to the screen. As a result after the fine adjustments several times, as illustrated in FIG. 17, the positions of the four corners of the projection target area 312 gradually approach the four corners of the (gray) area 310 corresponding to the screen roughly correspond to the four corners of the area 310 corresponding to the screen. The shape of the fine adjusted target projection area is not always rectangular during the fine adjustment. Further, slight non-linear distortion remains. Therefore, even in the final result, the shape may not be ideally rectangular.

Figure 18:
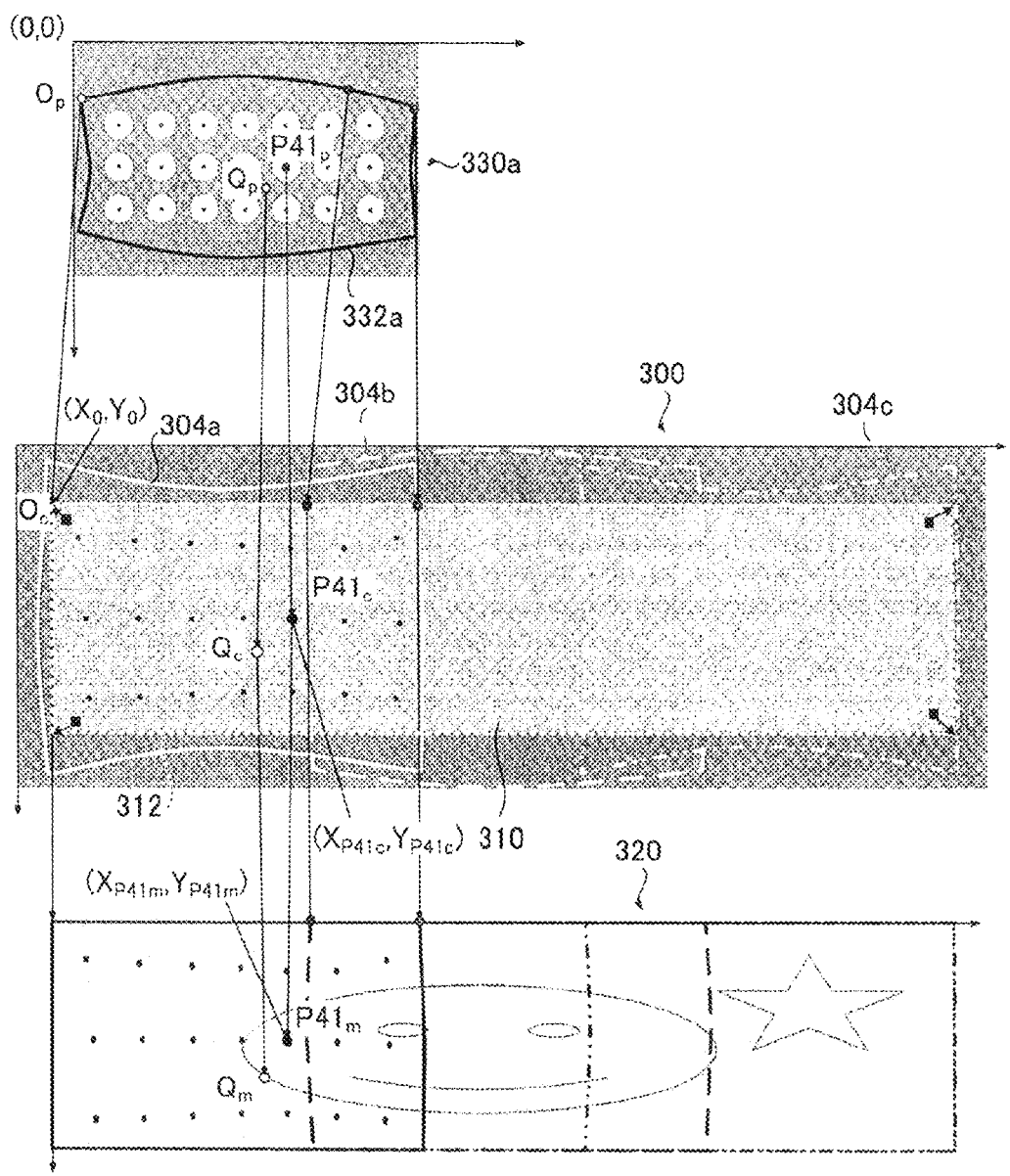
FIG. 18 is a drawing illustrating relationships of the coordinates on the projector memory after the adjustment relative to the pixel positions on the same magnification content image which corresponds to the positions of the projection content image.

The calculation process of calculating the geometric compensation coefficients in the fine adjustment is similar to that in the first time. Namely, the projective transformation "$H_t$" (t>1) for mapping the content image (rectangular) to the fine adjusted target projection area is acquired, so that the geometric compensation coefficients are calculated based on the projective transformation "$H_t$". FIG. 18 illustrates a state where as the several fine adjustments, the same magnification content image is mapped to the projection target area 312 which is expanded to fit the screen 102 in just the right size.

By using the user interface screen described above, it becomes possible for a user to project while monitoring (checking) the rough initial position of the project target area and finely adjust the positions of the four corners of the projection target area while reviewing the compensation result.

Modified Example of Projection Manner

In the above description, a case (configuration) is described where the projection images of the three projectors 150*a*, 150*b*, and 150*c* are arrange in a line in the horizontal line. However, an embodiment of the multiple projection to which the correction process in the present invention is not limited to the above configuration. FIGS. 19A through 19D illustrates other examples of the multiple production in other embodiments to which the correction process of this embodiment can also be applied.

Figure 19A:
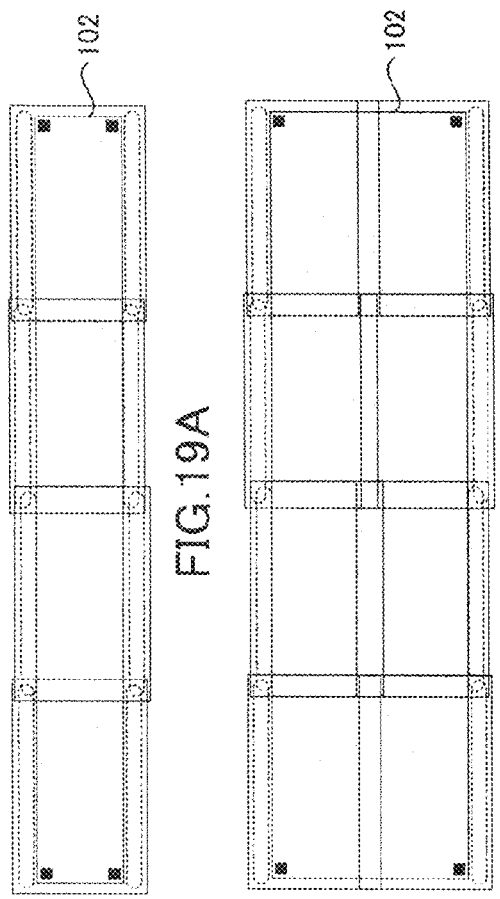
FIGS. 19A through 19D are drawings illustrating other examples of a multiple projection to which the correction process according to an embodiment can be applied.
Figure 19B:
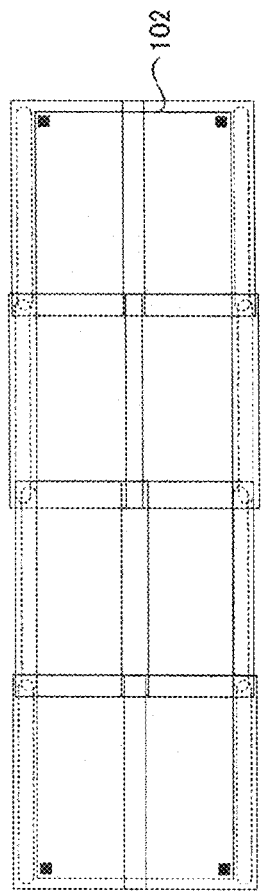
Figure 19C:
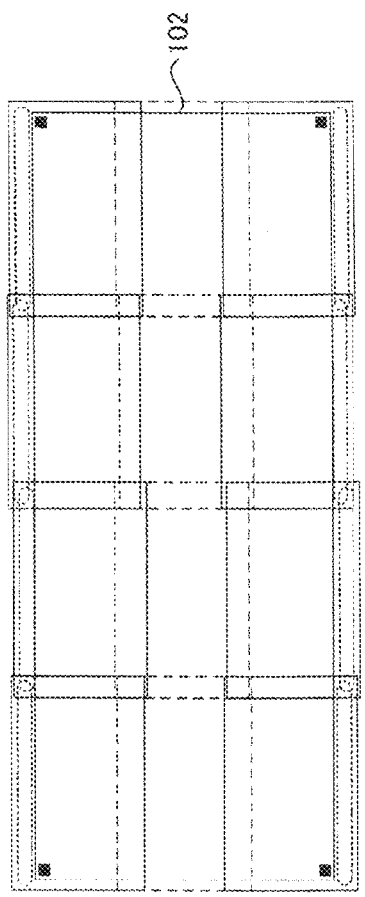
Figure 19D:
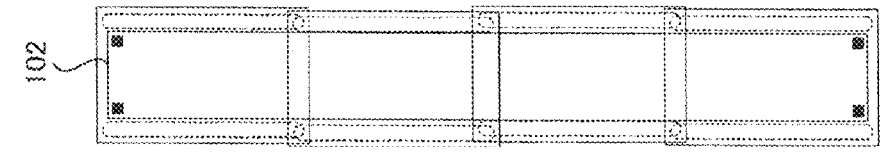

The number of the projectors is not limited to 3. Any arbitrary number of the projectors may be is used (FIG. 19A). Further, the projection manner is not limited to one line in the horizontal direction. For example, the projection images (projectors) may be arranged in one line in the vertical direction (FIG. 19B). Further, generally, projection images (projectors) may be arranged in two or more lines in the horizontal direction (FIGS. 19C and 19D).

In the case of the one line in the horizontal direction as illustrated in FIG. 19A, it is possible to form the margin parts (in dotted lines) on the upper side and the lower side of the correction images of the projectors. However, in the case of the one line in the vertical direction as illustrated in FIG. 19B, the margin parts may be formed on the left side and the right side of the correction images. Further, in the case of two or more lines, the margin parts are formed relative to the correction images of the projectors in charge of outer areas of the screen 102.

In this case, the margin parts are formed on the upper side of the correction images of the projectors in charge of upper outer side of the screen 102, and other margin parts are formed on the lower side of the correction images of the projectors in charge of lower outer side of the screen 102. Further, in the case of three or more lines, it is not always necessary to form a margin part relative to the projectors that are not in charge of any outer side of the screen 102 (i.e., the projectors corresponding to the projection images indicated by the dotted lines in FIG. 19D).

Modified Example of Projecting and Capturing the Correction Projection Scene

Further, in the above embodiment, a user fixes the camera 160 so that the whole of the projection images 212, 214, and 216, which correspond to all the connected projectors 150*a*, 150*b*, and 150*c*, can be captured within the angle of view of the camera 160 and uses the camera 160 to capture the projection images several times. However, for example, a user may set the camera 160 so that only a part of the whole of the projection images can be captured within the angle of view of the camera 160 and capture the projection images several times while changing the imaging range ("split imaging") so that the captured several images can be combined to form an image of the whole of the projection images.

Figure 20:
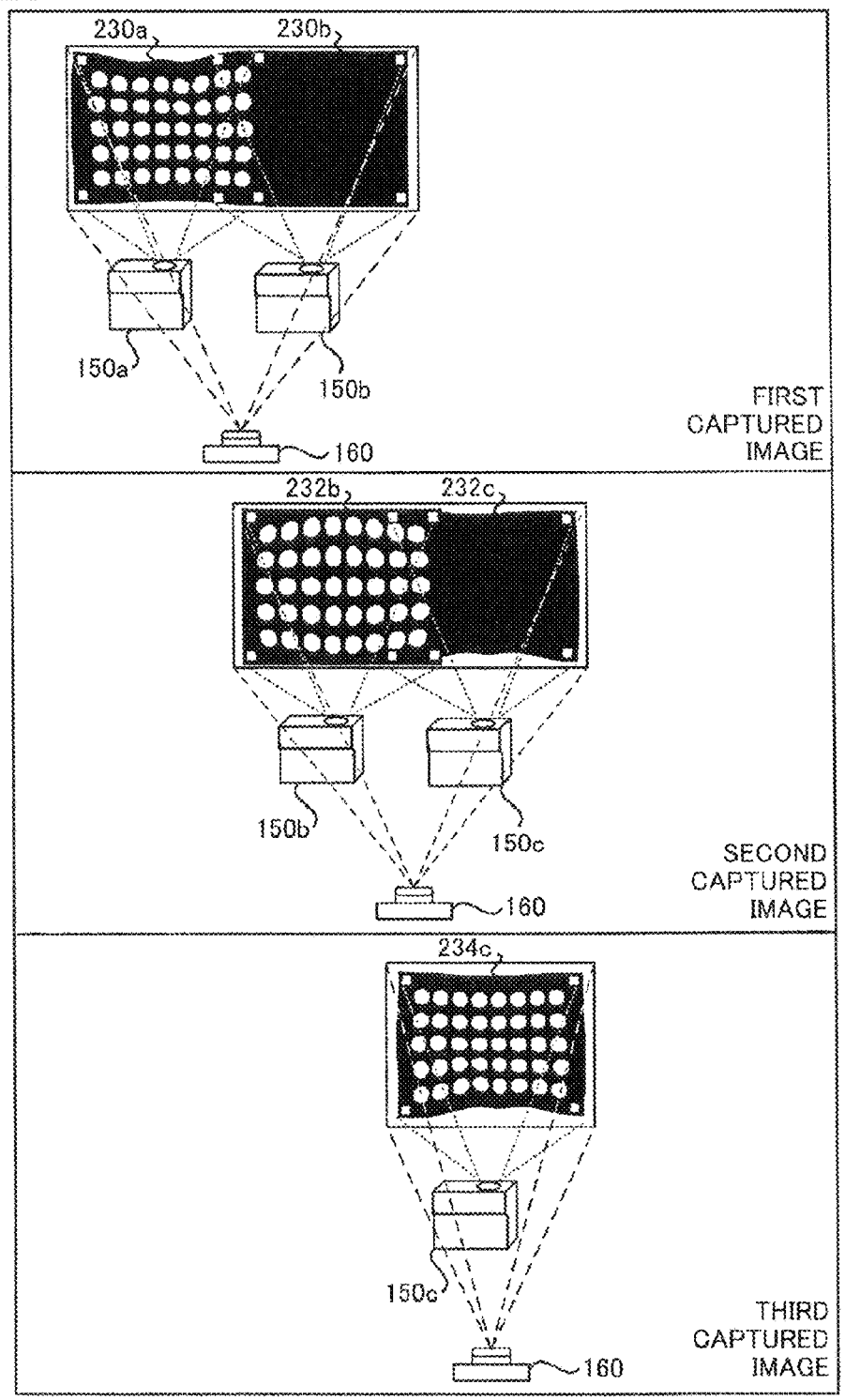
FIG. 20 is a drawing illustrating examples of correction projection scenes projected from the projectors in another embodiment.

In this regard, for example, as illustrated in FIG. 20, positioning markers indicating the four corners of the projection images are formed in the correction images. Then, a user sets the camera 160 so that only the correction images 230*a* and 230*b* corresponding to two projectors 150*a* and 150*b* adjacent to each other can be captured within the angle of view of the camera 160 and captures the image of the correction images 230*a* and 230*b*.

Then, the user moves the camera 160 and captures the image of the correction images 232*b* and 232*c*. Then, the user moves the camera 160 and captures the image of the correction image 234*c*. In such a case, the positioning markers formed on the correction images corresponding to the left and right ends of the projector may be used as the four-corner markers described above.

In this case, it becomes possible to integrate the characteristic points extracted from the correction captured images into the integrated coordinate system based on the projective transformation by using positioning markers commonly included among the plural correction captured images.

The characteristic point extraction integration section 132 can acquire the coefficients of the projective transformation based on the relationships of the coordinate positions of the positioning markers, and calculate the coordinates of the correction points on the integrated coordinate system that is integrated by performing the projective transformation between the coordinate systems of the plural correction captured images.

In order to further improve the accuracy, a correction image from the same projector is projected several times and different captured ranges of the correction image are acquired. Based on the different captured ranges of the correction image, plural groups of the correction points may be combined. In any cases, T groups "$L_1$ through $L_T$" of correction points corresponding to T projectors included in the system and the reference points "M" are extracted on the integrated coordinate system.

Projection Image in the Initial Projector Installation

In the initial installation of the projectors, it is desired to adjust so that the arrangement of the correction patterns are included in the screen 102. However, it is also desired that the screen 102 is fully filled with the area which is the result of logical "OR" of the projectable areas of the projectors. To that end, however, if the correction images having black background are projected, it is difficult to determine the projectable ranges of the projectors, which makes it difficult to install the projectors. Namely, when images having background whose brightness is greater than or equal to a predetermined value such as white color are used, the ranges of the projectable areas become clear, which makes the initial installation of the projectors easier.

On the other hand, in the above "Modified example of projecting and capturing the correction projection scene", the "split imaging" is described. In the split imaging, while one projector projects the arrangement of correction patterns, another projector next to the one projector projects the positioning markers, so that the split image is captured.

However, in this case, if images with black patterns on white background are used, a white background part of the adjacent projector may overlap the black pattern. In this case, the black pattern may become brighter, so that it becomes difficult to detect the black pattern. Namely, in the case of the split imaging, the overlapping areas are generated. Therefore, it is preferable to capture the correction images having black background color.

Therefore, in a preferred embodiment, in the initial installation of the projectors, if the correction images have black patterns on white background, the correction images are directly projected from the projectors at the same time. On the other hand, if the correction images have white patterns on black background, black/white inversion is performed on the correction images and the inversed correction images are projected from the projectors at the same time. By doing this, it becomes possible to project the images having white background (i.e., having brightness greater than or equal to a predetermined value) from all the projectors.

Further, the images include the arrangement of correction patterns and four-corner markers. Therefore, it becomes easier to perform the initial installation of the projectors in a manner so that the screen is fully filled with the area which is the result of logical "OR" of the projectable areas of the projectors, and the four-corner markers and the arrangement of the correction patterns are included in the screen.

Correction Process in a Second Embodiment

The correction process in the embodiments described above can be preferably applied to a case where plural projectors 150a, 150b, and 150c can be installed so as to almost optimally project the images to the screen 102. Namely, in the above embodiments, as illustrated in FIGS. 6A and 6B, the arrangement of the projectors 150a, 150b, and 150c is adjusted in a manner so that the projection images 210a, 210b, and 210c have roughly equal overlapped areas and cover the screen 102 with slight protrusion parts. Such arrangement may be easily realized when the projectors are normal focus projectors of an optical system of a pin-hole model.

This is because the size and the position of the projection image can be arbitrarily adjusted to some extent based on a zoom function, a focusing function, and a lens shift function or simply by adjusting slightly the gradient of the projectors. A peripheral part of the projection images of the projectors become darker or blurred, so that the image quality is degraded. When the projectors 150a, 150b, and 150c are arranged as illustrated in FIG. 6A or 6B, the waste of the pixels can be reduced, the resolution of the projection images which are jointly projected becomes optimal, and the image quality is optimized because the center parts of the projection images are used.

Figure 21B:
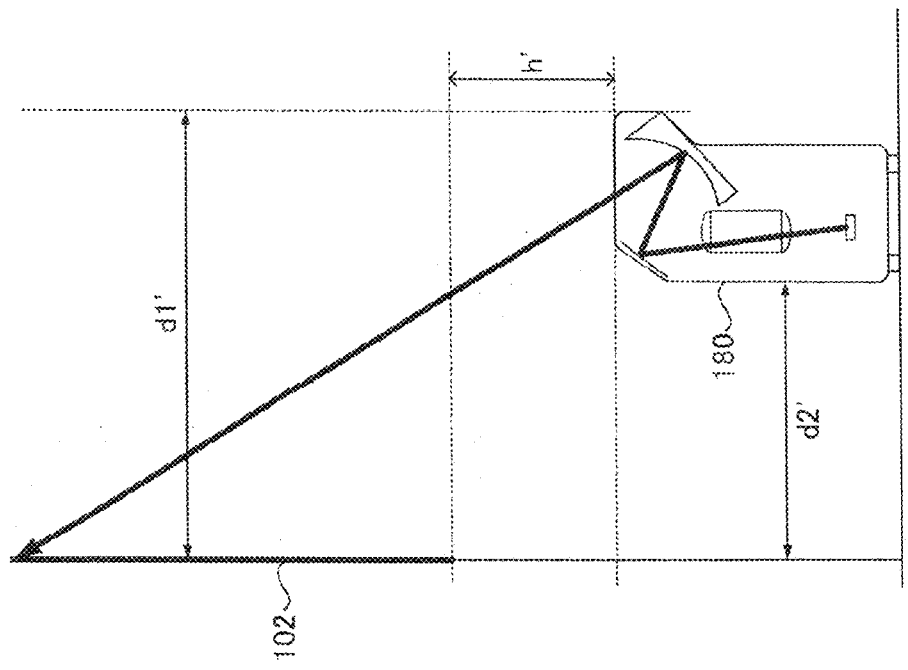
FIGS. 21A and 21B are drawing illustrating relationships between the projection image and installation conditions of an ultra-short focus projector.
Figure 21A:
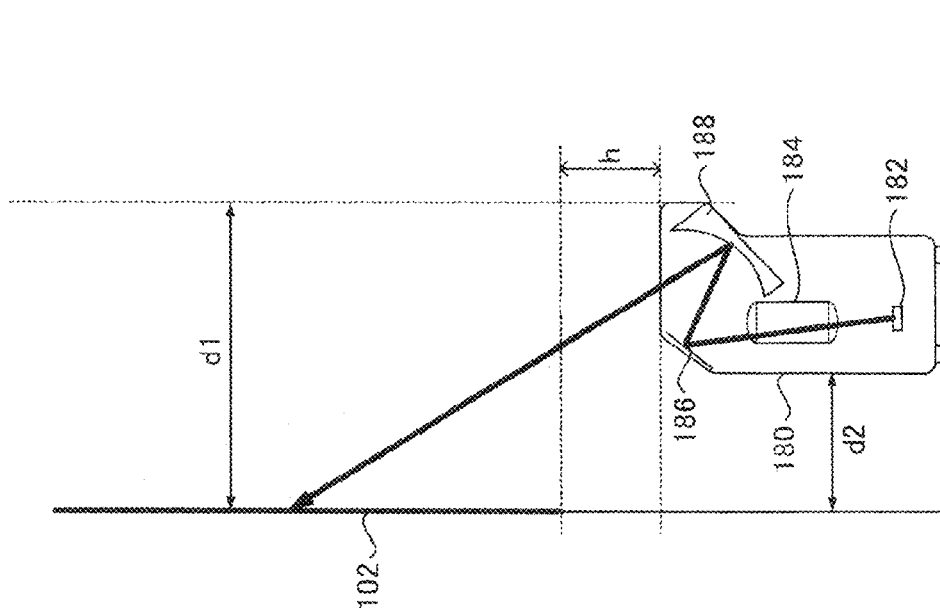

However, in the case of an ultra-short focus projector, there may be a case where the optimal arrangement of the projectors is difficult. As illustrated in FIG. 21A, an ultra-short focus projector 180 includes a display panel 182, a lens system 184, a reflection mirror 186, and a free curved-surface mirror 188. Due to the free curved-surface mirror 188 included in the ultra-short focus projector 180, as exemplarily illustrated in FIGS. 21A and 21B, the distances "d1" and "d2" from the screen where a projection image having a desired size, and relative height "h" are limited within predetermined narrow ranges.

Due to the limitations, if the installation positions of the projectors 150a, 150b, and 150c relative to the screen 102 can be freely designed, it does not matter. However, when such limitations are necessary based on the installation environment, there may be a case where it becomes difficult to arrange and adjust the projectors 150a, 150b, and 150c so as to acquire the states as illustrated in FIGS. 6A, 6B, and 22A.

For example, there may a case where the height is physically limited when the height of the stand on which the projectors are mounted is fixed. Further, there may be a case where the distance to the screen is physically limited due to, for example, the existence of an obstacle. Further, there may be a case where a clearance is physically limited when the clearance between the projectors are fixed. In such cases, there may be a case where it is basically impossible to install and adjust the projectors 150a, 150b, and 150c in a manner so that the correction patterns and the four-corner markers are included in the screen 102 as illustrated in FIGS. 6A, 6B, and 22A.

Figure 22A:
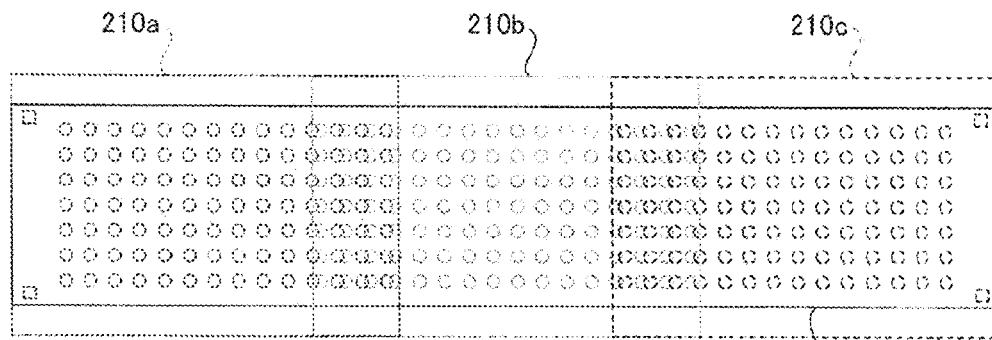
FIG. 22A is a drawing illustrating an example projection state in a case where a correction pattern can appropriately cover the screen based on various geometric conditions between the projection images of the projectors and the installation conditions.
Figure 22B:
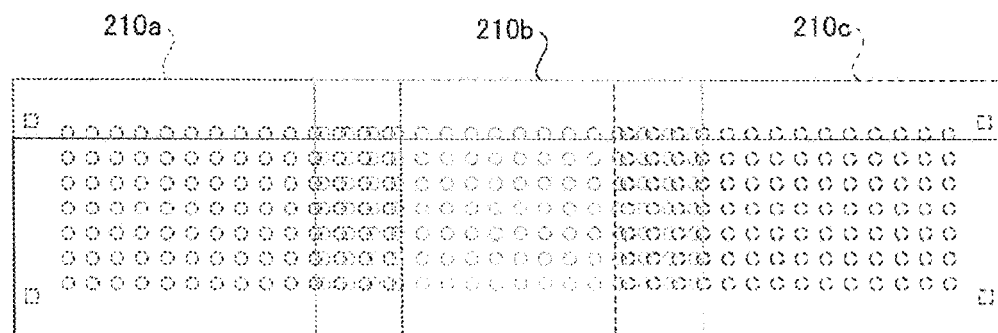
FIG. 22B is a drawing illustrating an example projection state in a case where a correction pattern protrudes from the upper side of the screen based on the various geometric conditions.
Figure 22C:
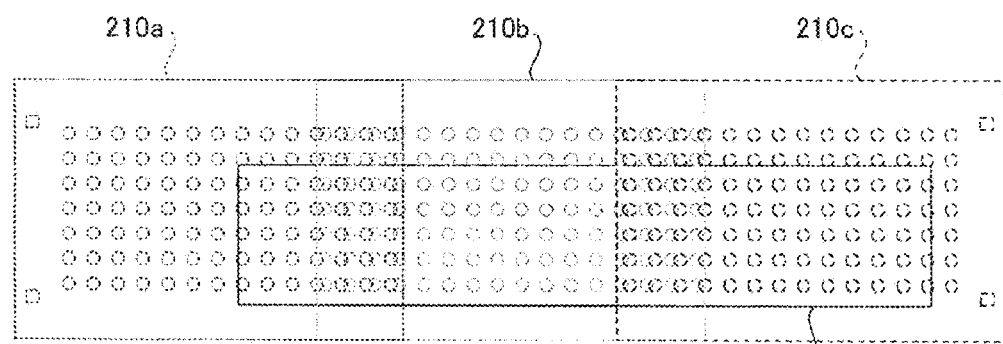
FIG. 22C is a drawing illustrating an example projection state in a case where a correction pattern protrudes from the upper, the lower, the left, and the right sides of the screen based on the various geometric conditions.

FIGS. 22B and 22C exemplarily illustrate the projection images in such cases where the projectors 150a, 150b, and 150c cannot be optimally installed physically. FIG. 22B illustrates a case where the height of the projectors 150a, 150b, and 150c relative to the screen 102 is too low. Due to this, the upper end (side) of the correction patterns and the four-corner markers protrude beyond the screen. FIG. 22C exemplarily illustrates a case where the projectors 150a, 150b, and 150c cannot approach the screen 102, namely the distance between the screen and the projectors is too large, the size of the projection images relative to the screen becomes meaninglessly large and the projection images in the horizontal direction are unequally protruding on left and right sides.

An object of the second embodiment described below is to address a case where it is difficult to install the projectors 150a, 150b, and 150c in a manner so that the correction patterns and the four-corner markers included in the projection images 210a, 210b, and 310c are arranged within the screen 102 as illustrated in FIGS. 6A, 6B, and 22A.

Then, in the projection system 100 according to the second embodiment, in a case where there exists a limitation in the physical installation positions, the correction images and the correction scenes are generated in a manner such that a higher priority is placed on the arrangement of the correction patterns within the screen 102 than the resolution or accuracy as a whole image.

In the projection system 100 according to the second embodiment, before the correction images' are generated, while the projectors 150a, 150b, and 150c project initial correction images in which the markers to be positioned to the four corners of the screen 102 (hereinafter referred to as "screen corresponding area designation markers") are drawn, the moving instructions from a user to move the screen corresponding area designation markers are received.

Then, the correction scene generation section 120 generates the correction images including optimized margin parts for the projectors 150a, 150b, and 150c based on the reference points of the screen corresponding area designation markers designated by the user. The positional information of the screen corresponding area designation markers on the coordinate system of the projectors 150a, 150b, and 150c indicate the size and the positions relative to the screen 102.

In the second embodiment, the positional information of the screen corresponding area designation markers regulates the relationships between the projection images of the projectors 150a, 150b, and 150c and the screen 102, more specifically geometric relationships.

In the following, a correction process according to the second embodiment is described with reference to a flowchart in FIG. 23, a user interface in FIGS. 24A and 24B, and a margin calculation process in FIGS. 25A through 25C. FIG. 23 is a flowchart of a whole procedure of the correction process according to the second embodiment. The process in FIG. 23 starts from step S300 in response to an instruction to start the correcting process.

In step S301, the image processing apparatus 110 receives the inputs about the installation information (e.g., the number of projectors to be connected, whether the projectors are arranged in one line in the horizontal direction, in one line in the vertical direction, or how many rows and columns) from a user. In the second embodiment, the aspect ratio of the screen 102 is not requested to be input by a user.

In step S302, the image processing apparatus 110 causes the projectors 150 to project the initial correction images that include the screen corresponding area designation markers as a preprocessing of generating the correction images. In this embodiment, the screen corresponding area designation markers are positioned at the four corners of the screen 102. In the case of one line in the horizontal direction, the first and "T"th projectors from the left end and the first and "T"th projectors are in charge of corner areas of the screen 102, so that those projectors project the initial correction images including the screen corresponding area designation markers.

Figure 24A:
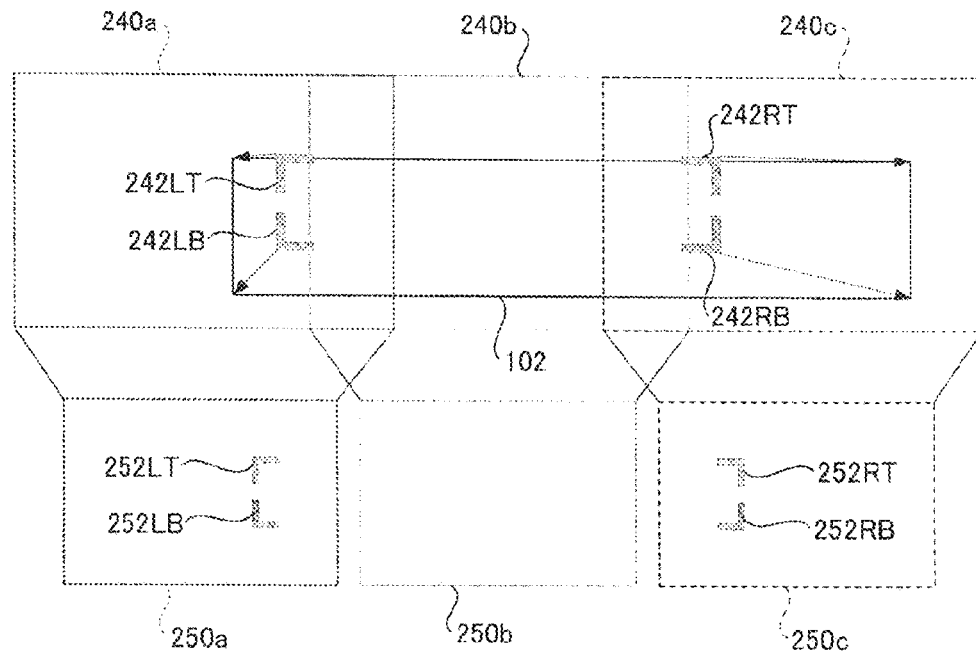
FIGS. 24A and 24B are drawings illustrating initial correction images including respective screen corresponding area designation markers and initial correction projection images which are the projection of the initial correction images.
Figure 24B:
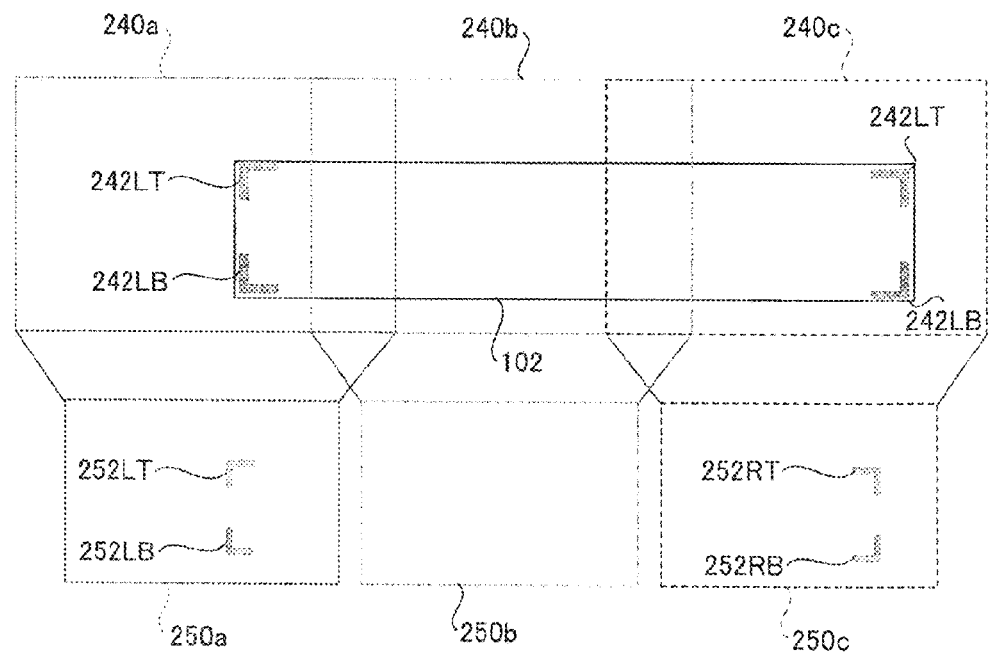

FIGS. 24A and 24B illustrate the initial correction images including the screen corresponding area designation markers and the corresponding "initial correction projected images" that are the projected initial correction images. FIG. 24A illustrates an initial state before the adjustment, and FIG. 24B illustrates a state after the adjustment.

As illustrated in FIG. 24A, the initial correction image 250a, which is projected by the left-end first projector 150a, includes the screen corresponding area designation markers 252LT and 252LB which are to be positioned at the left top corner and the left bottom corner, respectively, of the screen 102.

On the other hand, the initial correction image 250c, which is projected by the right-end third projector 150c, includes the screen corresponding area designation markers 252RT and 252RB which are to be positioned at the right top corner and the right bottom corner, respectively, of the screen 102. Further, the initial correction image 250b, which is projected by the second projector 150b installed in the center, does not include any markers but includes only background color in this embodiment.

On the outer side of the screen, a projection image is likely to be largely distorted and there may exist a pattern. Therefore, it is preferable to set the initial positions of the screen corresponding area designation markers 252 to be inside of the screen 102 so as to be projected inside the screen 102.

Further, as the background color of the initial correction images 250a, 250b, and 250c, it is possible to select (use) a color having the brightness value greater than or equal to a predetermined value like white color with the view of making it easier to initially install the projectors 150a, 150b, and 150c.

The positions of the screen corresponding area designation markers 252 in the initial correction images 250 can be changed by using a mouse, a keyboard, or the like which is connected to the image processing apparatus 110. While visually determining the positions of area designation markers 242 in initial correction projection images 240a and 240c, a user instructs the image processing apparatus 110 to move the positions of the screen corresponding area designation markers 252.

As illustrated in FIG. 24B, after having adjusted so that the positions of the area designation markers 242 are roughly fit in the four corners of the screen 102, the initial positioning is completed by, for example, pressing a button.

Referring back to FIG. 23, in step S303, the image processing apparatus 110 determines whether the initial positioning by the screen corresponding area designation markers 252 has been completed. In step S303, when it is determined that no instruction indicating the completion of the initial positioning is received from a user (NO in step S303), the process loops back to step S302.

On the other hand, when it is determined that the instruction indicating the completion of the initial positioning is received from a user (YES in step S303), the image processing apparatus 110 acquires the current positional coordinates of the screen corresponding area designation markers on the respective projector coordinate systems, and the process goes to step S304.

In step S304, the image processing apparatus 110 generates the correction images and further generate the correction projection scenes based on the installation conditions of the projectors input by a user and the positional information of the screen corresponding area designation markers adjusted by a user by using the screen corresponding area designation markers.

Figure 25A:
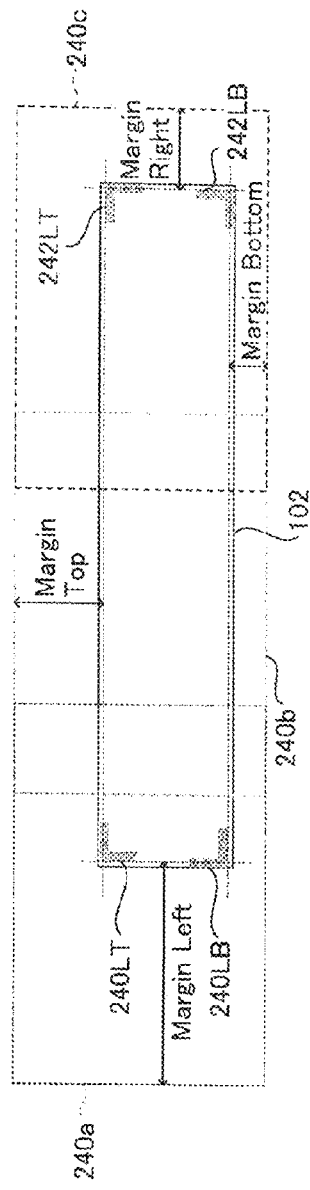
FIGS. 25A through 25C are drawings illustrating an example of a margin calculation process according to the second embodiment.

FIG. 25A schematically illustrates the margin calculation process according to the second embodiment. A user moves the screen corresponding area designation markers on the projected images of the projectors 150 by using the user interface. While visually checking the projected images, the user designates the positions of the screen corresponding area designation markers so as to roughly fit the four corners of the screen 102. As the projector coordinates at that time, the coordinates values of the four corners are acquired.

The coordinates of the four corners do not always indicate a rectangular shape. Therefore, as for the margin parts on upper, lower, left, and right sides, it is possible to select a larger one. In a particular embodiment, as for the size of the margin parts (Margin Top) formed on the upper side of the correction images, it is possible to adopt (select) the length from the upper end to the left top marker on the coordinate system of the left-end first projector 150a or the length from the upper end to the right top marker on the coordinate system of the right-end third projector 150c, whichever is greater.

Similarly, as for the size of the margin parts (Margin Bottom) formed on the lower side of the correction images, it is possible to adopt (select) the length from the lower end to the left bottom marker on the coordinate system of the left-end first projector 150a or the length from the lower end to the right bottom marker on the coordinate system of the right-end third projector 150c, whichever is greater. As for the size of the margin parts (Margin Left) formed on the left side of the correction image of the left-end first projector 150a, it is possible to adopt (select) the length from the left end to the left top marker or the left bottom marker on the coordinate system of the left-end first projector 150a, whichever is greater.

As for the size of the margin parts (Margin Right) formed on the right side of the correction image of the right-end third projector 150c, it is possible to adopt (select) the length from the right end to the right top marker or the right bottom marker on the coordinate system of the right-end third projector 150c, whichever is greater.

Figure 25B:
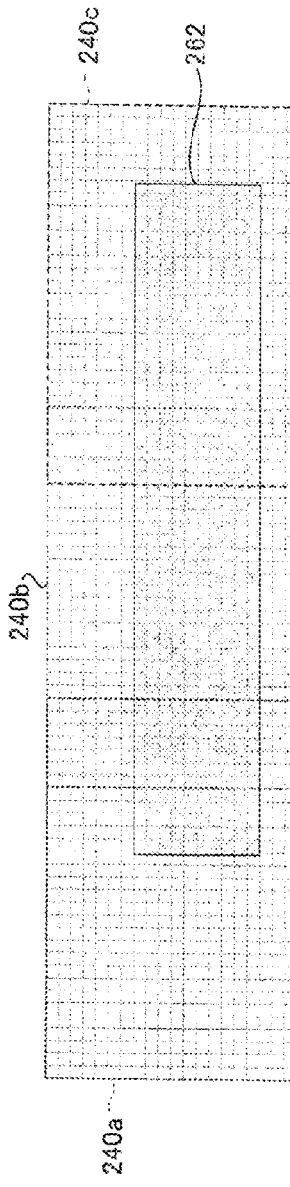

FIG. 25B illustrates the projection images of the projectors 150a, 150b, and 150c and the blocks formed by dividing the areas. As illustrated in FIG. 25B, the screen corresponding area 262 is defined by the screen corresponding area designation markers. Further, as illustrated in FIG. 25C, the margin parts (margin areas) in the correction images correspond to the blocks that do not correspond to the screen corresponding area 262, and the ranges defined by the blocks corresponding to the screen corresponding area 262 are the correction areas.

It may be possible to use the correction areas in which the correction patterns are arranged in a lattice manner. However, in a preferred embodiment, there are additionally formed the margin parts outside the correction pattern areas where the arrangement of the correction patterns are formed in the correction areas. Further, in a preferred embodiment, in order to maintain the extraction accuracy, the size of the correction patterns is set to a constant size regardless of the size of the margin parts. To that end, for example, the number of the rows and columns of the correction patterns may be changed in accordance with the size of the margin parts.

Figure 25C:
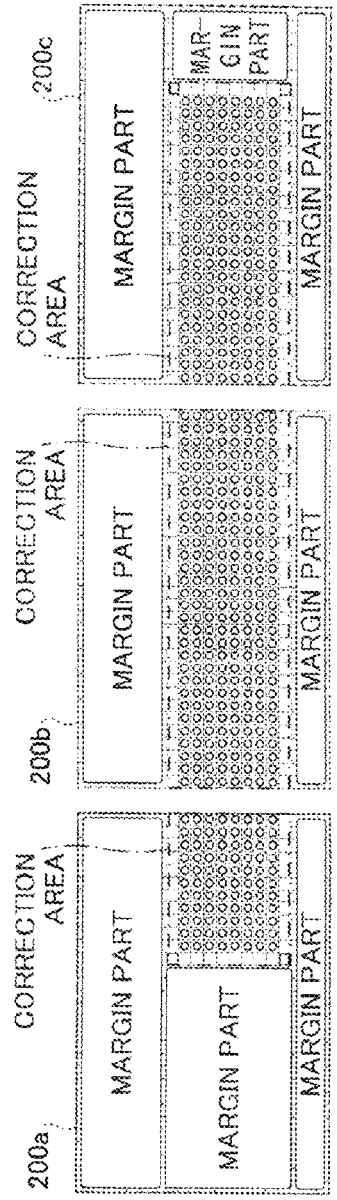

As illustrated in FIG. 25C, the whole of the first correction image 200a for the first projector 150a is divided into 30 blocks in the horizontal direction and into 20 blocks in the vertical direction. Among the 30×20 blocks, there are margin parts formed in the areas of upper 7 blocks, lower 3 blocks, and left 18 blocks, so that the correction area of 12×10 blocks area is formed on the lower and right side of the first correction image 200a.

Further, in the correction area of 12×10 blocks, in the area of 11×8 blocks on the center and right side of the correction area, the circular correction patterns are arranged. The projection image having the circular correction patterns formed as described above is used.

In the second correction image 200b, there are margin parts formed in the areas of upper 7 blocks and lower 3 blocks, so that the correction area of 30×10 blocks other than the above margin parts is defined. In the third correction image 200c, there are margin parts formed in the areas of upper 7 blocks, lower 3 blocks, and right 6 blocks, so that the correction area of 24×10 blocks area is formed on the lower and left side of the third correction image 200c.

Further, in the example of FIG. 25C, the four-corner markers are provided at the left top and the left bottom of the correction area in the first correction image 200a corresponding to the left end and at the right top and the right bottom of the correction area in the third correction image 200c corresponding to the right end.

Referring back to FIG. 23 again, in step S305, the image processing apparatus 110 causes the projectors 150a, 150b, and 150c to sequentially project the generated correction projection scenes, and acquires the correction captured images, which correspond to the correction projection scenes, by using the camera 160. The processes in steps S306 through S315 are similar to those in steps S104 through S113, and the detailed description thereof is herein omitted.

As described above, a user visually determines whether it is desired to adjust, and adjusts the positions of the projected screen corresponding area designation markers. By doing this, it becomes possible to calculate appropriate margin parts and perform a highly-accurate correction process even under a limited condition in the arrangement of the projectors.

Further, in this embodiment, a case is described where the screen corresponding area designation markers are positioned to fit the four corners of the screen 102. However, the present invention is not limited to this configuration. In another embodiment, the screen corresponding area designation markers may be positioned to fit the circumference of the screen 102 including not only the four corners but also the sizes of the screen 102. For example, the screen corresponding area designation markers may be formed in the initial correction image 250b of the projector 150b installed at the center in a manner so that the screen corresponding area designation markers are positioned to fit the upper and lower sides of the screen 102.

Further, the shape of the screen corresponding area designation markers is not limited to the coronoid shape as illustrated in FIG. 25. Any other shape may be used as the shape of the screen corresponding area designation markers.

Switching of Margin Designation Modes

Figure 26:
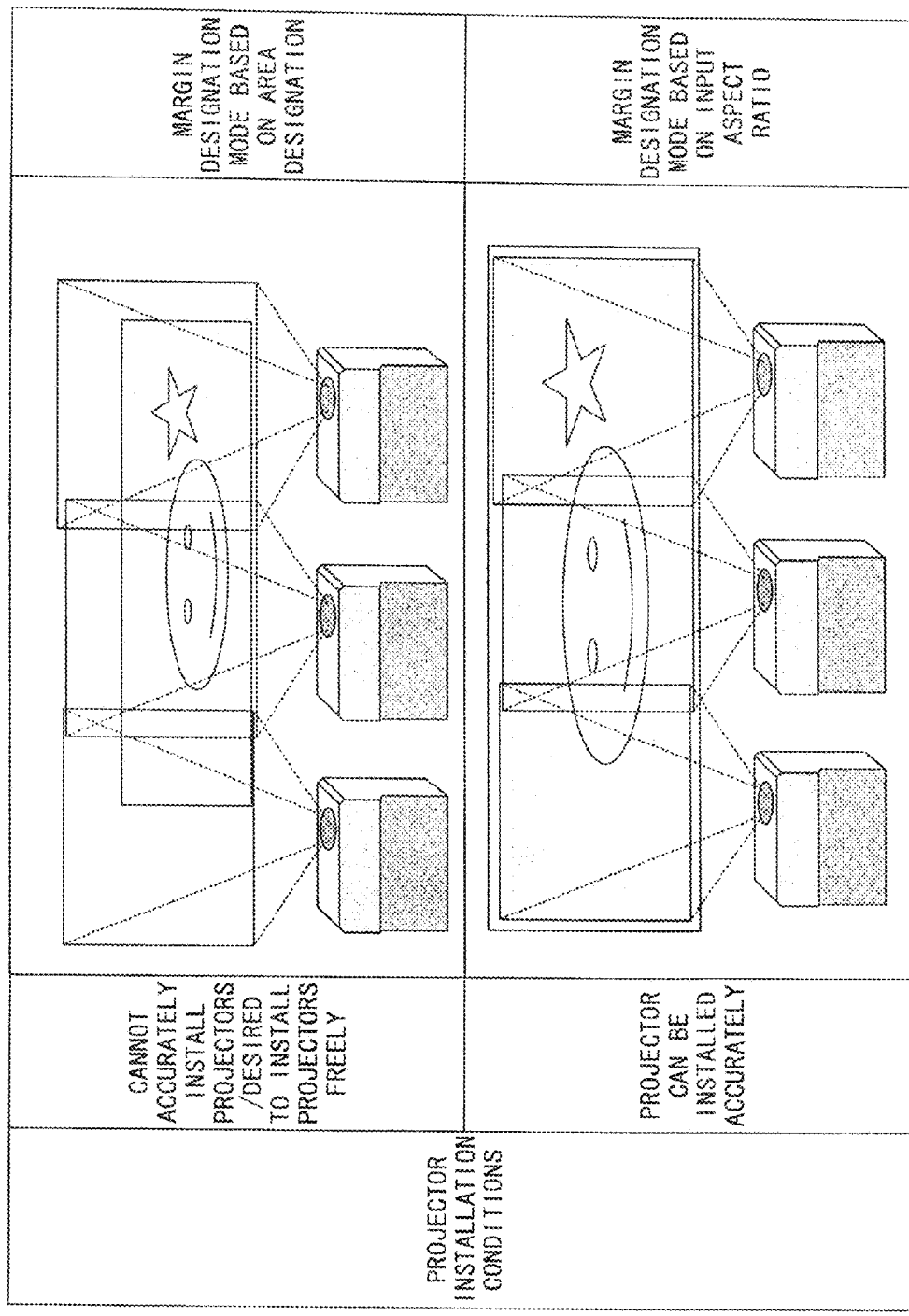
FIG. 26 is a drawing illustrating a state to which a margin designation mode based on an aspect ratio and the margin designation mode based on a screen corresponding area designation can be appropriately applied.

FIG. 26 illustrates cases where a margin designation mode based on the input aspect ratio and a margin designation mode based on the screen corresponding area designation are preferably applied. The margin designation mode based on the input aspect ratio in FIG. 26 corresponds to the correction process of FIG. 7 and the margin designation, mode based on the screen corresponding area designation corresponds to the correction process of FIG. 23. In a preferred embodiment, the image processing apparatus 110 can switch between the margin designation mode based on the input aspect ratio and the margin designation mode based on the screen corresponding area designation based on user's designation.

The margin designation mode based on the screen corresponding area designation illustrated in upper part of FIG. 26 can be preferably selected in a case where the projector cannot be accurately arranged due to limitation of an installation environment or where it is desired to install the projectors in higher degree of freedom even when there is no specific limitation of the installation environment. In this case, the projectors can be installed relatively freely. Therefore, the workload of the installation operation of the user may be lowered.

On the other hand, the margin designation mode based on the input aspect ratio illustrated in lower part of FIG. 26 can be preferably selected in a case where there are only a few limitations on an installation environment so that the projectors can be accurately installed. In this case, there is little waste of pixels and the resolution of the projection images that is connected by the projection becomes optimal. Further, the image quality also becomes optimal because center parts of the projection images are used.

Hardware Configuration

In the following, an example hardware configuration of the image processing apparatus 110 according to an embodiment is described with reference to FIG. 27. Typically, as the image processing apparatus 110, a general-purpose computing apparatus is used. FIG. 27 illustrates an example configuration of a general-purpose computing apparatus according to an embodiment.

A general-purpose computing apparatus (image processing apparatus) 110 includes a Central Processing Unit (CPU) 12, a north bridge 14 forming the connection between the CPU 12 and a memory, and a south bridge 16. The south bridge 16 is connected to the north bridge 14 via a dedicated bus or a Peripheral Component Interconnect (PCI) bus, and forming connections with Input/Output (I/O) such as the PCI bus and a Universal Serial Bus (USB).

The north bridge 14 is connected to a Random Access Memory (RAM) 18, which provides a working area for the CPU 12, and a graphic board 20 which outputs a video signal. The graphic board 20 is connected to a display 50 or the projectors 150 via a video output interface such as an analog RGB, High-Definition Multimedia Interface (registered trademark) (HDMI) (registered trademark), Digital Visual Interface (DVI), DisplayPort (registered trademark), etc.

The south bridge 16 is connected to a PCI port 22, a Local Area Network (LAN) port 24, an IEEE 1394 port 26, a USB port 28, an auxiliary storage device 30, an audio input/output 32, and serial port 34. The auxiliary storage device 30 is a Hard Disk Drive (HDD), a Solid State Drive (SSD), etc., and stores an Operation System (OS) for controlling the computer apparatus, programs to implement the function parts described above, various system information, and various setting information. The LAN port 24 is an interface device to connect the general-purpose computing apparatus (image processing apparatus) 110 to a network wirelessly or by wire.

The USB port 28 may be connected to an input device 170 such as a keyboard 52 or a mouse 54, so as to provide the user interface to receive the input of various instructions including, for example, instructions to move the four-corner markers and the screen corresponding area designation markers from an operator. The general-purpose computing apparatus (image processing apparatus) 110 according to an embodiment reads a program from the auxiliary storage device 30, and loads the program to the working area (space) provided by the RAM 18.

By doing this, the various functions and processes described above can be realized under the control of the CPU 12. Further, the projections 150 and the camera 160 are not specifically described. However, those devices also have the hardware including the CPU, the RAM, etc., and dedicated hardware for specific purposes.

As described above, according to an embodiment of the present invention, it becomes possible to provide a projection system, an image forming apparatus in the projection system, a correction method performed by a computer, a program to realize the image forming apparatus, and a projection device which are capable of easily performing a correction process on plural projection means in accordance with the relationships between the projection images of the plural projection means and a projected target area on which an image as a whole is projected by the plural projection means.

Further, the above function parts may be implemented by a computer-executable program written in a legacy programming language such as, for example, assembler, C, C++, C#, and Java (registered trademark), or an object-oriented programming language. Further, such a program may be stored in a device-readable recording medium such as a Read-Only Memory (ROM), an Electrically Erasable Programmable ROM (EEPROM), an EPROM, a flash memory, a flexible disk, a Compact Disc ROM (CD-ROM), a CD-ReWritable (CD-RW), a Digital Versatile Disk ROM (DVD-ROM), a DVD-RAM, a DVD-RW, a Blu-ray disk, an SD card, a Magneto-Optical disk (MO), etc., or may be distributed via electric telecommunication lines.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection system comprising:
   a plurality of projectors configured to collectively project an image as a whole on a projection area;
   memory storing computer-readable instructions; and
   one or more processors configured to execute the computer-readable instructions such that the one or more processors are configured to,
      generate correction images including respective correction points which are used for detecting distortions of projection images, which are projected by the respective projectors, based on designated relationships between the projection images of the projectors and the projection area,
      calculate compensation coefficients, which correspond to the projectors, based on one or more correction captured images that are acquired by capturing the correction images projected on the projection area,
      generate margin parts in the correction images, which correspond to the projectors that project the projection images in outer areas of the projection area, in a manner so that parts defining the correction points in the correction images are projected within the projection area while the parts defining correction points in the correction images corresponding to the projectors that are next to each other are overlapped,
      detect an overlapped area between the projection images of the projectors next to each other, one of the projectors being a target projector, and
      calculate blending coefficients that are used to adjust an overlap between the projection image of the target projector and the projection image of the projector next to the target projector.

2. The projection system according to claim 1,
   wherein the one or more processors are configured to execute the computer-readable instructions such that the one or more processors are configured to generate positioning markers in peripheral areas of the parts defining the correction points in the correction images of the projectors that project the projection images in corner areas of the projection area, the positioning markers defining reference points that are used as marks in positioning to the corner areas of the projection area.

3. The projection system according to claim 2, wherein the one or more processors are configured to execute the computer-readable instructions such that the one or more processors are configured to
define a projection target area, to which the image as a whole is collectively projected by the projectors, based on plural reference points which correspond to all corners of the projection area, the reference points being extracted from the one or more correction captured images, and
calculate the compensation coefficients, which correspond to the projectors, based on the reference points.

4. The projection system according to claim 3, further comprising:
the one or more processors are configured to execute the computer-readable instructions such that the one or more processors are configured to,
receive moving instructions to move the reference points defining the projection target area while the image as a whole is projected on the projection target area, and
recalculate the compensation coefficients, which correspond to the projectors, based on the reference points that have been updated in response to the moving instructions.

5. The projection system according to claim 4, further comprising:
a user interface,
wherein the one or more processors are configured to execute the computer-readable instructions such that the one or more processors are configured to,
change adjustment amounts, with a granularity of plural steps, relative to initial positions of four-corner reference points defining the projection target area, based on input from the user interface, and
wherein the adjustment amounts refer to values on an integrated coordinate system where the correction points of the projectors are integrated, and are scaled by using coordinates of the reference points in the integrated coordinate system and coordinates of the positioning markers on coordinate systems of the projectors.

6. The projection system according to claim 1, wherein the designated relationships between the projection images of the projectors and the projection area include installation conditions of the projectors and shape characteristics of the projection area, and
wherein the installation conditions of the projectors include a number of installed projectors, an arrangement manner of the projection images of the projectors, and an aspect ratio of the projection images of the projectors, and the shape characteristics of the projection area include an aspect ratio of the projection area.

7. The projection system according to claim 3, wherein the one or more processors are configured to execute the computer-readable instructions such that the one or more processors are configured to,
acquire projective transformation from the projection target area to the image as a whole based on coordinates of the reference points defining the projection target area and coordinates of corners if the image as a whole,
convert coordinates of the correction points of the projectors into a coordinate system of the image as a whole based on the projective transformation, the correction points being extracted from the correction captured images, and
calculate geometric compensation coefficients that provide the projection images projected by the projectors by associating coordinate systems of the projectors with a coordinate system of the image as a whole based on relationships between the correction points on the coordinates of the projectors and the extracted correction points.

8. The projection system according to claim 7, wherein the one or more processors are configured to execute the computer-readable instructions such that the one or more processors are configured to generate intermediate images of the projectors from the image as a whole based on the geometric compensation coefficients, and calculate final projection images of the projectors from the intermediate images based on the blending coefficients.

9. The projection system according to claim 1, wherein the designated relationships between the projection images of the projectors and the projection area include relative positional information of the projection area relative to the projection images projected from the projectors.

10. The projection system according to claim 9, wherein the one or more processors are configured to execute the computer-readable instructions such that the one or more processors are configured to,
output initial correction images, which include area designation markers which are to be positioned at a periphery of the projection area, to the projectors that project the images in peripheral areas of the projection area, and
receive moving instructions to move the area designation markers,
wherein the relative positional information of the projection area is acquired in response to the moving instructions to move the area designation markers.

11. The projection system according to claim 1, wherein the one or more processors are configured to execute the computer-readable instructions such that the one or more processors are configured to control the projectors to simultaneously output images in which figure patterns defining lattice points are written on a background having brightness greater than or equal to a predetermined value to the respective projectors in the case of initial installations of the projectors.

12. The projection system according to claim 1, the one or more processors are configured to execute the computer-readable instructions such that the one or more processors are configured to calculate coordinates of the correction points on an integrated coordinate system that is integrated by performing a projective transformation between coordinate systems of the correction captured images.

13. The projection system according to claim 1, further comprising:
an imaging device configured to capture the correction captured images.

14. The projection system according to claim 1, wherein the one or more processors are configured to execute the computer-readable instructions such that the one or more processors are configured to control the projectors such that the margin parts are projected outside the projection area, and the parts defining the correction points in the correction images are projected within the projection area and not projected outside the projection area.

15. An image processing apparatus for causing a plurality of projectors to collectively project an image as a whole on a projection area, the image processing apparatus comprising:

memory storing computer-readable instructions; and one or more processors configured to execute the computer-readable instructions such that the one or more processors are configured to, generate correction images including respective correction points which are used for detecting distortions of projection images, which are projected by the respective projectors, based on designated relationships between the projection images of the projectors and the projection area, calculate compensation coefficients, which correspond to the projectors, based on one or more correction captured images that are acquired by capturing the correction images projected on the projection area, generate margin parts in the correction images, which correspond to the projectors that project the projection images in outer areas of the projection area, in a manner so that parts defining the correction points in the correction images are projected within the projection area while the parts defining correction points in the correction images corresponding to the projectors that are next to each other are overlapped, detect an overlapped area between the projection images of the projectors next to each other, one of the projectors being a target projector, and calculate blending coefficients that are used to adjust an overlap between the projection image of the target projector and the projection image of the projector next to the target projector.

16. A correction method executed by a computer causing a plurality of projectors to collectively project an image as a whole on a projection area, the correction method comprising:

generating correction images including respective correction points which are used for detecting distortions of projection images, which are projected by the respective projectors, based on designated relationships between the projection images of the projectors and the projection area;

causing the projectors to project the generated correction images;

receiving an input of one or more correction captured images that are acquired by capturing the correction images projected on the projection area; and calculating compensation coefficients, which correspond to the projectors, based on the one or more correction captured images;

detecting an overlapped area between the projection images of the projectors next to each other, one of the projectors being a target projector; and calculating blending coefficients that are used to adjust an overlap between the projection image of the target projector and the projection image of the projector next to the target projector, wherein margin parts are generated in the correction images, which correspond to the projectors that project the projection images in outer areas of the projection area, in a manner so that parts defining the correction points in the correction images are projected within the projection area while the parts defining correction points in the correction images corresponding to the projectors that are next to each other are overlapped.

17. The correction method according to claim 16, wherein the generating correction images includes generating positioning markers in peripheral areas of the parts defining the correction points in the correction images of the projectors that project the projection images in corner areas of the projection area, the positioning markers defining reference points that are used as marks in positioning in the corner areas of the projection area.

18. The correction method according to claim 17, wherein the generating correction images further includes defining a projection target area, to which the image as a whole is collectively projected by the projectors, based on plural reference points which correspond to all corners of the projection area, the reference points being extracted from the one or more correction captured images, and wherein the calculating includes calculating the compensation coefficients, which correspond to the projectors, based on the reference points.

* * * * *